(12) United States Patent
Barnes et al.

(10) Patent No.: US 8,090,005 B2
(45) Date of Patent: Jan. 3, 2012

(54) SPREADING CODES FOR A SATELLITE NAVIGATION SYSTEM

(75) Inventors: Brian Barnes, Portsmouth (GB); Steve Legate, Portsmouth (GB)

(73) Assignee: European Space Agency, Paris (FR)

( * ) Notice: Subject to any disclaimer, the term of this patent is extended or adjusted under 35 U.S.C. 154(b) by 702 days.

(21) Appl. No.: 11/994,038

(22) PCT Filed: Jul. 1, 2005

(86) PCT No.: PCT/EP2005/007235
§ 371 (c)(1),
(2), (4) Date: Jul. 8, 2008

(87) PCT Pub. No.: WO2007/003213
PCT Pub. Date: Jan. 11, 2007

(65) Prior Publication Data
US 2009/0196329 A1    Aug. 6, 2009

(51) Int. Cl.
*H04B 1/00* (2006.01)
(52) U.S. Cl. ........ 375/146; 375/130; 375/137; 375/136; 375/149; 375/150
(58) Field of Classification Search .................. 375/146, 375/130, 137, 136, 149, 150
See application file for complete search history.

(56) References Cited

U.S. PATENT DOCUMENTS

| | | | | |
|---|---|---|---|---|
| 5,210,770 A | * | 5/1993 | Rice | ............................. 375/142 |
| 5,724,046 A | * | 3/1998 | Martin et al. | ............ 342/357.69 |
| 5,963,584 A | | 10/1999 | Boulanger et al. | |
| 6,091,760 A | | 7/2000 | Giallorenzi et al. | |
| 6,459,407 B1 | * | 10/2002 | Akopian et al. | ......... 342/357.25 |
| 6,493,376 B1 | * | 12/2002 | Harms et al. | .................. 375/130 |

FOREIGN PATENT DOCUMENTS
EP    0586159 A2    3/1994

OTHER PUBLICATIONS

Lin et al., Optimal PN Sequence Design for Quasi-Synchronous CDMA Communication Systems, 1995 IEEE International Symposium on Circuits and Systems, Seattle, Apr. 30-May, 1995, New York, IEEE, US, vol. 1, Apr. 30, 1995, pp. 81-84, XP 000583186, ISBN: 0-7803-2571-0.

Hein et al., Status of Galileo Frequency and Signal Design, Proceedings of the Institute of Navigation GPS, Sep. 24, 2002, pp. 266-277, XP002273300.

(Continued)

*Primary Examiner* — Kabir A Timory
(74) *Attorney, Agent, or Firm* — Park, Vaughan, Fleming & Dowler LLP

(57) ABSTRACT

One embodiment of the invention provides a method of creating a set of secondary spreading codes for use in a satellite navigation system comprising a constellation of satellites. Each satellite in the constellation employs a tiered spreading code comprising at least a primary code and a secondary code. Each satellite in the constellation is allocated a different secondary spreading code from the set of secondary spreading codes. The method involves generating an initial set of bit patterns, where each bit pattern represents a potential secondary spreading code. The method further involves performing an optimization process on bit patterns within the initial set of bit patterns. As a result of the optimization, at least some of the bit patterns in the initial set are modified or replaced, to create a final set of bit patterns for use as the set of secondary spreading codes.

26 Claims, 8 Drawing Sheets

OTHER PUBLICATIONS

Pratt, A. R., A New Class of Spreading codes Exhibiting Low Cross-Correlation Properties, Proceedings of the Institute of Navigation GPS, Sep. 24, 2002, pp. 1554-1564 XP002346067.

Pratt et al., Concatenated Sequential Codes Performance Attributes and Applications for Galileo, Proceedings of the ION National Technical Meeting, the Institute of Navigation, US, Jan. 26, 2004, pp. 313-322, XP002346068.

Notice from the European Patent Office dated Oct. 1, 2007, concerning business methods, Journal of the European Patent Office, vol. 30, No. 11, Nov. 1, 2007, pp. 592-593.

* cited by examiner

SPREADING CODES FOR A SATELLITE NAVIGATION SYSTEM

FIELD OF THE INVENTION

The present invention relates to the generation and use of spreading codes for a satellite navigation system.

BACKGROUND OF THE INVENTION

Satellite navigation systems are becoming increasingly important in a wide range of applications, including handheld devices for position determination, in-car navigation support, and so on. The main satellite navigation system in service at present is the global positioning system (GPS) operated by the United States Department of Defense. Worldwide sales of GPS equipment reached nearly 3.5 billion dollars by 2003, and this figure is expected to grow steadily over the next few years. A European counterpart satellite navigation system, named Galileo, is planned for launch and service availability later this decade.

A satellite navigation system comprises a constellation of satellites that each broadcasts one or more signals to earth. The basic components of a satellite signal are a spreading code (also referred to as a positioning, synchronisation or ranging code) which is combined with navigation data. The resulting combination is then modulated onto a carrier at a set frequency for transmission to earth. Each satellite generally transmits at multiple frequencies, which can help to compensate for any atmospheric distortion.

In some cases, multiple signals (referred to as channels) may be modulated onto a single carrier via some appropriate multiplexing scheme. For example, it is planned for certain Galileo signals to comprise a data channel in phase quadrature with a pilot channel. The pilot channel contains only a spreading code, but no navigation data, while the data channel contains both the spreading code and the navigation data.

The spreading code component of a satellite signal typically comprises a predetermined sequence of bits (sometimes referred to as 'chips') and is used to perform two main tasks. Firstly, the spreading code provides a synchronisation mechanism to allow a receiver to lock onto a satellite signal. Thus each satellite (and typically each channel broadcast from that satellite) has its own synchronisation code. When a receiver is first switched on, it does not know which satellite signals can be received, since certain satellites in the constellation will be below the horizon for that particular location at that particular time. The receiver uses the synchronisation codes to lock into a signal from a first satellite. Once this has been done, the navigation data in the signal can be accessed. This then provides ephemeris data for the other satellites in the constellation, and allows the remaining satellites that are visible to the receiver to be acquired relatively quickly.

Many receivers employ a two-phase acquisition process. In the first phase, the receiver performs a simultaneous cross-correlation of the incoming signal against the set of all possible signals. This searches for a signal from any satellite, with any possible timing offset between the satellite and the receiver, and with any possible Doppler shift between the satellite and the receiver (which is dependent on the motion of the satellite in space). If a cross-correlation is found to exceed a predetermined threshold, then a second phase involving a more detailed analysis is performed for the relevant combination of satellite, timing offset and Doppler shift. This second-phase analysis may, for example, involve a longer integration time, an attempt to access and decode the navigation data, etc, in order to confirm that a correct acquisition has been made.

The second main task of a spreading code is to provide a distance estimate from the satellite to the receiver, based on the time that it has taken the signal to travel from the satellite to the receiver, which can be expressed as: $c(Tr-Ts)$, where:

c is the velocity of light (known, subject to ionospheric effects, etc),

Ts is the time of sending from the satellite, which is encoded into the signal itself, and Tr is the time of signal receipt at the receiver.

The position of the receiver can then be determined in three-dimensional space by using a process of trilateration, given the known positions of the satellites (as specified in their navigation data). In theory, this can be performed with signal information from a minimum of three satellites. In practice however we can write $Tr=Tm+o$, where Tm is the measured time of receipt at the receiver, and o is the offset between the receiver clock and satellite clock, which is generally unknown, except for specialised receivers. This then implies that signal information is obtained from at least one additional satellite to compensate for the unknown time offset at the receiver. If signals from further satellites are available, a statistical position determination can be performed using any appropriate algorithm such as least squares. This can also provide some indication of the error associated with an estimated position.

One important parameter for the spreading code is the bit rate at which the spreading code is transmitted, since this in turn controls the accuracy with which the positional determination can be made. For example, with a bit rate of 1 MHz, each bit represents a light travel time of 300 meters. The positioning accuracy is then determined by how accurately the phase offset between the satellite and the receiver can be judged for a single bit. This is generally dependent upon the noise in the system. For example, if the phase offset can be measured to an accuracy of 90 degrees ($\pi/2$), this corresponds to a positional determination of 75 meters. It will be appreciated that having a higher bit rate for the spreading code allows more accurate position determinations to be made.

Another important parameter for the spreading code is its total length, in other words the number of bits or chips in the spreading code before it repeats. One reason for this is that the finite length of the spreading code can lead to ambiguity in the position determination. For example, assume that the bit rate is 10 MHz and the total length of the bit sequence is 256 bits, which therefore corresponds to a light travel time of 7.68 km. As a result, the distance measurement from the satellite to the receiver is not uniquely specified, but rather can only be expressed as $7.68n+d$ km, where d is determined by the relative timing of the spreading code as broadcast and as received, but n is an unknown integer. There are various ways in which the ambiguity as to the value of n can be resolved, including using signals from a larger number of satellites, or by using knowledge of an approximate position derived from some other source. One common approach is to relate the code phase to the bit edge of the navigation data bit (this process is called bit synchronization), and also to relate the bit edge to the time of week (ToW) contained in the navigation data transmitted by the satellite.

It will be appreciated that increasing the repetition length for the spreading code helps to reduce problems with ambiguous distance determinations. A longer length for the spreading code also provides better separation of signals from different sources, and increased robustness against interference. On the other hand, having a longer repetition length for the spreading code may delay initial acquisition of the signal, as well as requiring more processing capability within the receiver. The length of the spreading code also impacts the data rate that can be used for the navigation data, since there is normally only one bit of navigation data for each complete spreading code sequence (otherwise the two would interfere). Therefore, the longer the repetition length for the spreading code, the lower the bit rate for the navigation data.

One known strategy to counter this problem is to use a hierarchical or tiered spreading code based on primary and secondary codes. If we assume that the primary code has N1 bits and the secondary code has N2 bits, then the first N1 bits of the overall spreading code correspond to the primary sequence exclusive-ORed with the first bit of the secondary code, the next N1 bits of the spreading code comprise a repeat of the N1 bits of the primary code, this time exclusive-ORed with the second bit of the secondary code, and so on. This gives a total repetition length for the code of N1×N2. However, the repetition length for synchronisation purposes is only N1, since the primary code will still give a correlation peak irrespective of the value of the bit from the secondary code (this will just change the sign of the correlation peak). Likewise, the bit rate of the navigation data is dependent on the length of the primary code alone (N1), rather than the length of the primary and secondary codes combined (N1*N2).

The GPS spreading codes are implemented using linear feedback shift registers (LFSRs), in which selected outputs from an N-stage shift register are tapped and fed back to the input. The feedback connections within the LFSR can be represented as a polynomial of order N, whereby the operation of an LFSR can be fully specified by its polynomial and the initial setting of the LFSR.

GPS uses a subset of LFSRs known as Gold codes that have certain special mathematical properties. One of these is that they generate an output of pseudo-random noise having a maximal repetition length of $2^N-1$, so that a relatively compact LFSR can generate an output with a long repetition length. Gold codes also have good auto-correlation properties that support accurate positioning. In particular, the autocorrelation function has a well-defined peak at zero time shift, and is relatively small for all other (i.e. non-zero) time shifts. It is also possible to select a set of Gold codes that have good cross-correlation properties, whereby the cross-correlation function between different codes is kept relatively small. This is important for signal acquisition, since it helps to prevent a synchronisation code from one satellite being accidentally mistaken for a synchronisation code from another satellite. A further important practical criterion for a spreading code is to have equal (or nearly equal) numbers of ones and zeros—this is referred to as balancing.

Additional information about satellite navigation systems, and in particular about GPS, can be found in: "Re-Tooling the Global Positioning System" by Per Enge, p 64-71, Scientific American, May 2004, and in "Global Positioning System: Signals, Measurements and Performance", by Misra and Enge, Ganga-Jamuna Press, 2001, ISBN 0-9709544-0-9. Information about the proposed Galileo signals can be found in: "Status of Galileo Frequency and Signal Design" by Hein et al, September 2002, available from: http://europa.eu.int/comm/dgs/energy_transport/galileo/doc/galileo_stf_ion2002.pdf, see also "Galileo Frequency and Signal Design" by Issler et al, GPS World, June 2003, available from: http://www.gpsworld.com/gpsworld/article/articleDetail.jsp?id=61244. A proposed Galileo/GPS receiver is described in: "HIGAPS—A Large-Scale Integrated Combined Galileo/GPS Chipset for the Consumer Market" by Heinrichs et al, available from http://forschung.unibw-muenchen.de/papers/krc5ejjflurjj9jsrxk4spthvmg0be.pdf.

Although the use of Gold codes is well-established for existing satellite navigation systems, there are some limitations associated with such codes. For example, they are only available with certain code lengths (not all values of N can be used for the LFSR polynomial). In general, the code length is determined by the ratio of the chip rate of the spreading code and the bit rate of the navigation data. If the code length is restricted to an available Gold code, then this implies a constraint on the chip rate and the bit rate, which might in turn impact other considerations, such as acquisition time and positioning accuracy. In some cases, the limitation on code length for Gold codes has been overcome by using truncated Gold codes, but this truncation has an adverse impact on the mathematical properties of the code set (in terms of the auto-correlation function, etc).

In addition, the cross-correlation properties of Gold codes are not generally optimised for the situation where the polarity of the code changes from one repetition of the code to the next, in accordance with the navigation data that is being transmitted. This latter problem is exacerbated where the bit rate of the navigation data is relatively high (as for Galileo), since this leads to a significant probability that a spreading code transmission has the opposite polarity from the immediately preceding transmission of the spreading code. (This is also the reason for the provision of pilot channels in Galileo, in order to aid acquisition without disruption by the navigation data).

Cross-correlation properties are also of particular concern for locations having relatively poor signal reception, such as inside a building. In this case a first signal from one satellite may be strong, for example, if there is a line of sight to the satellite through a window, while a second signal from another satellite may be substantially weaker, for example, if the line of sight to the second satellite passes through significant building structure. In this situation, if an attempt is made to acquire the second satellite, there is a risk that the correlation against the stronger but incorrect first signal may yield a greater (or similar) result than the correlation against the weaker but correct second signal. Although any resulting misidentification of the first signal as the second signal will normally be corrected later in a subsequent acquisition phase, this introduces delays, as the acquisition procedure then has to return to the first phase. If there are multiple such misidentifications, acquisition time may be increased significantly.

SUMMARY OF THE INVENTION

Accordingly, one embodiment of the invention provides a method of creating a set of secondary spreading codes for use in a satellite navigation system comprising a constellation of satellites. Each satellite in the constellation employs a tiered spreading code comprising at least a primary code and a secondary code. Each satellite in the constellation is allocated a different secondary spreading code from the set of secondary spreading codes. The method comprises generating an initial set of bit patterns, where each bit pattern represents a potential secondary spreading code. The method further comprises performing an optimisation process on bit patterns within the initial set of bit patterns so that at least some of the bit patterns in the initial set are modified or replaced, thereby creating a final set of bit patterns for use as the set of secondary spreading codes.

The provision of different secondary codes for different satellites has been found to reduce correlation between the codes from the different satellites, and so helps with improved receiver performance. The use of an optimisation process to determine the set of secondary codes offers more flexibility than codes sets based on mathematical algorithms (such as Gold codes), for example in terms of the length of the secondary code, the number of codes available in a set, and the particular properties of the codes.

In one embodiment, the bit patterns in the initial set of bit patterns comprise random sequences of bits, although any other suitable starting patterns may be used, for example as generated by linear feedback shift registers or some other pseudo-random algorithm. Note that the use of randomly created initial bit patterns generally helps to ensure good coverage of the overall search space for potential secondary codes. During the optimisation process, the bit patterns may be modified by randomly flipping a bit in at least one of the bit patterns. For longer secondary codes it may be desirable to flip multiple bits during at least the initial part of the optimisation process in order to speed convergence, although since the secondary codes are usually relatively short (compared to the overall length of a tiered code), flipping just a single bit of the code for each iteration has generally been found to give a reasonable speed of convergence. The bit modifications may be reversed if it is found that they lead to decreased performance (thereby ensuring that the set of bit patterns does not deteriorate), although such decreased performance may be accepted on a probabilistic basis (especially if the decrease is not too great) in order to give the optimisation the ability to escape from local maxima.

It will be appreciated that there is a wide variety of known optimisation strategies, such as simulated annealing, genetic algorithms, and so on, and any suitable such strategy may be employed to create the final set of bit patterns. In some of these strategies, the optimisation may involve the generation of a larger population of bit patterns followed by selection of the best examples (e.g. survival of the fittest), while other strategies may be based on continuous modification of individual bit patterns within a predetermined set.

In one embodiment, the optimisation process includes rejecting bit patterns that fail a balance criterion, thereby ensuring that there is relatively little DC component in the codes. The balance criterion may be based on the square root of the number of bits in a bit pattern, which reflects the expected DC component for a random code. Note that in other embodiments, code balance might be included as part of the formal optimisation—i.e. the optimisation works to reduce balance, rather than simply rejecting bit patterns with a balance that is greater than a given threshold. Another possibility is that once bit patterns having good balance properties have been identified, then the optimisation process is arranged to leave the balance invariant (such as by selecting pairs of bits to flip, one being a 0 and one being a 1). Other code criteria that might be handled in a similar manner to balance include the maximum run length of a particular bit value (either one and/or zero).

In one embodiment, the optimisation process utilises a performance (or cost) function derived from the auto-correlation function for a bit pattern. This can be used to select bit patterns that have good individual properties. A performance or cost function derived from the cross correlation function can then be used to select a group of bit patterns that in combination form a good set of codes. It will be appreciated that minimal side-lobes in the auto-correlation function lead to a better acquisition properties, for example, the signal can be acquired more easily under poor reception conditions, such as indoors and under tree foliage, while minimum cross-correlation with other codes reduces multiple access interference and intra-system noise, thereby increasing the robustness of signal acquisition, tracking, and data demodulation.

The optimisation process may include a first phase of identifying bit patterns having good individual properties, and a second phase of selecting the set of secondary spreading codes from the identified bit patterns having good individual properties. The number of bit patterns identified as having good individual properties may be significantly higher than the number of satellites in the constellation. For example, the first phase may identify a group of 250 or more bit patterns that have good individual properties. Such a group then provides a good range of choice during the second phase of the optimisation, as well as accommodating potential uses of the codes outside the satellite constellation itself—e.g. in pseudolites, as discussed in more detail below, which can lead to a requirement for a larger number of potential codes.

The use of first and second phases for the optimisation has been found to be a convenient and effective approach for performing the optimisation. However, other embodiments might only use a single phase of optimisation that is performed directly on groups of bit patterns.

In one embodiment, the second phase includes calculating the cross correlation function between every pair of identified bit patterns having good individual properties. This exhaustive search of all possible combinations has been found to be more efficient computationally than an iterative search of potential sets of bit patterns, although the latter approach might be used if appropriate (for example, if the number of identified bit patterns is very large).

In one embodiment, the number of bits in a bit pattern for a secondary code is in the range 25 to 512, more particularly in the range 50 to 128. Note that for very short secondary code lengths, the available code space can be searched exhaustively to determine a suitable set of bit patterns (rather than using a form of optimisation procedure as described herein).

Another embodiment of the invention provides a receiver incorporating a final set of bit patterns created using the above method. The bit patterns in the receiver may be protected by an error-correcting code. The receiver may have at least one read only memory (ROM) that stores the secondary code portions of the tiered spreading codes, and optionally the primary code portions as well. In some receivers, it may be possible to update this ROM, for example to reflect any changes to the spreading codes emitted from the satellites.

In some implementations, the receiver may incorporate bit patterns for at least two satellite constellations, for example Galileo and GPS. Note that the GPS spreading codes are Gold codes, and are normally generated within a receiver using a linear feedback shift register. However, the GPS codes could be stored as complete bit patterns if it is desired to have a single consistent approach to be used for multiple satellite navigation systems.

Note that there are various ways in which the bit patterns may be provided to the receiver. For example, in some embodiments the bit patterns may be pre-installed into the receiver. In some embodiments, the bit patterns may be installed (or upgraded) into the receiver via some form of removable memory device, such as flash memory. In some embodiments, the bit patterns may be installed (or upgraded) into the receiver over a network, for example by downloading over the Internet or over a mobile telephone network (the latter is particularly convenient if the receiver itself is incorporated into some form of mobile telephone device). With this latter approach, the codes need not necessarily be stored in the receiver itself, but rather may just be accessed as and when required over the network.

Accordingly another embodiment of the invention provides a method of operating a server that communicates with receivers for use in conjunction with a satellite navigation system. The method comprises storing a set of bit patterns corresponding to secondary codes used by the satellite navigation system, and in response to a received request from a receiver to access the set of stored bit patterns, supplying the stored bit patterns to the receiver for use in acquiring signals from the satellite navigation system. The bit patterns may be supplied over the telephone network, the Internet, or any other suitable network.

Another embodiment of the invention provides a satellite incorporating one or more bit patterns from a final set of bit patterns created using a method such as described above. One or more such bit patterns can also be incorporated into a pseudolite. (A pseudolite generates an analogous positioning signal to that from a navigation satellite, but a pseudolite is ground-based, and is typically employed at locations where high accuracy is required, for example around airports, to augment positioning signals from satellites).

The approach described herein allows a decision on the final form of the secondary spreading codes to be delayed until a very late stage of system development, since the hardware (e.g. a memory device) need not be specific to a given code (unlike a particular LFSR). Furthermore, it may be possible to update the bit patterns stored in a satellite already in orbit. Such updating may be performed in response to a detected error in the stored bit pattern (perhaps induced by a cosmic ray), as well as being useful for in-orbit testing of codes during the last phase of implementation or commissioning. The update facility is also beneficial if it becomes desirable to transmit a different code from that originally planned, for example because of interference with other services, or because certain slots have been re-allocated. In such circumstances it will generally be required to perform a corresponding update to the receivers, although another reason for updating may be to restrict the set of users that can access the spreading code from the satellite (either for commercial or security reasons).

Note that although the approach described herein is primarily intended for use in satellite navigation systems (including pseudolites), it could also be employed in other navigation or communication systems (satellite, terrestrial or maritime) that have previously used LFSRs to generate synchronisation codes and such-like.

BRIEF DESCRIPTION OF THE DRAWINGS

Various embodiments of the invention will now be described in detail by way of example only with reference to the following drawings.

DETAILED DESCRIPTION

Figure 1A:
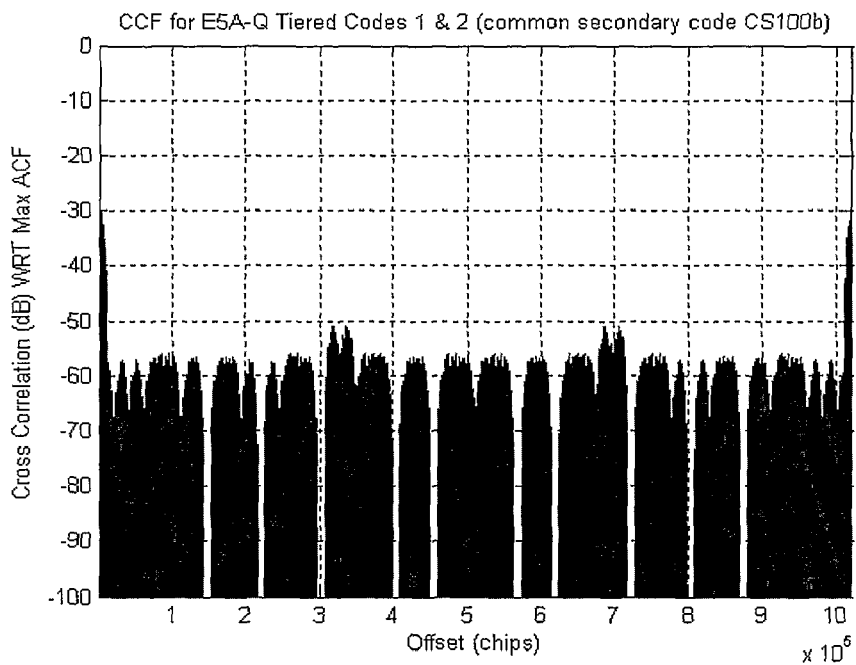
FIG. 1A illustrates simulated cross-correlation function (CCF) performance between the first two tiered spreading codes sharing a common secondary code for the originally proposed Galileo E5A-Q pilot signals.

The following abbreviations are used in the present description:
ACF Auto Correlation Function
BPSK Binary Phase Shift Keying
CCF Cross Correlation Function
CRC Cyclic Redundancy Code
CS Commercial Service
CT Crosstalk
DC Direct Current (zero frequency component)
ECC Error Correcting Code
ELW Excess Line Weight
HNV Highest Neighbour Value
LFSR Linear Feedback Shift Register
MEWSD Mean Excess Welch Square Distance
MP Multipath
NV Neighbour Value
PROM Programmable Read Only Memory
PSK Phase Shift Keying
RMS Root Mean Square
ROM Read Only Memory Note also that within this description code sequences are defined for convenience in logic level format (0 and 1); in practice these code sequences are translated to bipolar (±1) signal levels for modulation and correlation purposes. The mapping between the spreading code logic levels and corresponding signal levels in accordance with one embodiment of the invention is shown in Table 1.

TABLE 1

| Mapping Between Code Logic & Signal Levels | |
|---|---|
| Logic Level | Signal Level |
| 1 | −1.0 |
| 0 | +1.0 |

Table 2 summarises the proposed main ranging code parameters for each Galileo signal component for various services (OS=open service, CS=closed service, SoL=safety of life service). This table excludes the public regulated service (PRS) spreading codes that use cryptographically generated pseudo-random sequences.

TABLE 2

Galileo Spreading Code Summary

| Signal | Service(s) | Signal Type | Symbol Rate (per second) | Code Length (ms) | Chip Rate (Mcps) | Code Length (chips) Primary | Secondary |
|---|---|---|---|---|---|---|---|
| E5A-I | OS | Data | 50 | 20 | 10.23 | 10230 | 20 |
| E5A-Q | OS | Pilot | N/A | 100 | 10.23 | 10230 | 100 |
| E5B-I | OS/CS/SoL | Data | 250 | 4 | 10.23 | 10230 | 4 |
| E5B-Q | OS/CS/SoL | Pilot | N/A | 100 | 10.23 | 10230 | 100 |
| E6-B | CS | Data | 1000 | 1 | 5.115 | 5115 | — |
| E6-C | CS | Pilot | N/A | 100 | 5.115 | 5115 (10230) | 100 (50) |
| L1-B | OS/CS/SoL | Data | 250 | 4 | 1.023 | 4092 | — |
| L1-C | OS/CS/SoL | Pilot | N/A | 100 | 1.023 | 4092 | 25 |

The proposed Galileo spreading code sequence lengths and construction method take into account various signal parameters and performance-related requirements. For all the signal codes shown above the overall sequence lengths have been chosen to be equal to one symbol period for the data signals or 100 ms for the pilot signals. For compatibility reasons with GPS, the chipping rates are all multiples of 1.023 MHz. As can be seen most of the codes use a tiered approach whereby a primary code is repeated in order to achieve the required overall code sequence length, which is equal to the product of the primary and secondary code lengths. The tiered code approach simplifies the generation of long spreading codes and allows a receiver to acquire the signals just using the primary code sequences, if required, in order to minimise acquisition times.

Note that a shorter primary code length of 5115 has now been adopted for the commercial service (CS) pilot code on E6 to match that of the corresponding data spreading code, which would be beneficial where both the data and pilot signals are combined for acquisition purposes. As a result, the 50 bit secondary code length as previously proposed would be increased to 100 bits. Therefore, the families of 50 bit secondary codes described later may no longer be needed for the currently proposed Galileo signal on E6-C, which could instead make use of the same 100 bit codes as developed for the E5 pilot signals (and as described in more detail below).

Each Galileo satellite uses an independent primary code for each signal component in order to provide basic CDMA operation. The primary codes proposed for the E5 signals are based on a family of Gold codes that are generated from the product of a pair of LFSRs (Linear Feedback Shift Registers), while the codes currently proposed for E6-B&C and L1-B&C use a family of primary codes based on the active optimisation of random codes, as described in PCT application PCT/EP2004/014488.

Table 3 lists the secondary codes previously proposed for the Galileo system, in which the secondary code indicated would be used as a common secondary code for all the corresponding primary code family members. (Note that only certain of the codes have been allocated to particular Galileo signals, as indicated in Table 3; in addition, Table 3 does not reflect the change of the E6-C signal secondary code from 50 bits to 100 bits).

TABLE 3

Original Galileo Baseline Secondary Code Summary

| Code Identifier | Code Length (chips) | Signal | Code Sequence (Octal) |
|---|---|---|---|
| $CS_{4a}$ | 4 | E5B-I | 16 |
| $CS_{20a}$ | 20 | — | 0 146 537 |
| $CS_{20b}$ | 20 | E5A-I | 2 041 351 |
| $CS_{25a}$ | 25 | L1-C | 34 012 662 |
| $CS_{50a}$ | 50 | E6-C | 31 353 022 416 630 457 |
| $CS_{50b}$ | 50 | — | 30 700 356 335 526 664 |
| $CS_{100a}$ | 100 | — | 1 325 627 352 355 616 455 613 377 214 003 321 |
| $CS_{100b}$ | 100 | E5A-Q | 1 736 526 276 160 463 054 356 046 605 322 257 |
| $CS_{100c}$ | 100 | — | 0 163 523 007 752 215 002 507 555 473 370 713 |
| $CS_{100d}$ | 100 | E5B-Q | 1 017 667 551 661 733 412 501 077 343 115 434 |

Figure 1B:
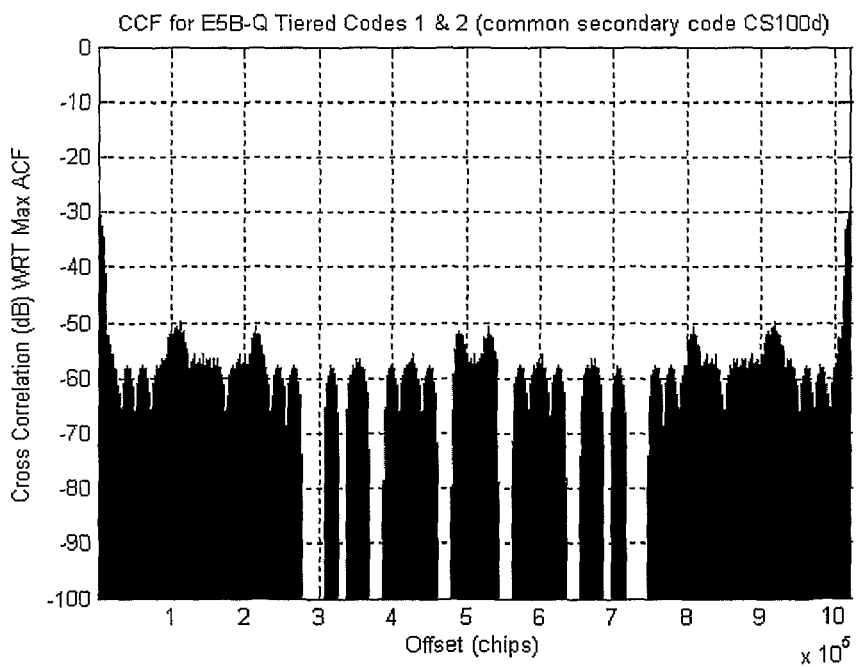
FIG. 1B illustrates simulated cross-correlation function performance between the first two tiered spreading codes sharing a common secondary code for the originally proposed Galileo E5B-Q pilot signals.

FIG. 1A illustrates the simulated cross-correlation function (CCF) performance between the first two tiered spreading codes for the E5 pilot signals, assuming that the E5A-Q signal codes all share the same 100 chip $CS_{100b}$ secondary code. The primary codes are all 10230 chips in length so the overall tiered code length is 1023000 chips (100 ms). FIG. 1B shows similar CCF results for the first two E5B-Q pilot signal codes, which share the same $CS_{100d}$ secondary code. No Doppler offset has been included in these simulations (i.e. the plots have been calculated for zero Doppler frequency offset between the two received spreading codes).

As can be seen the CCF performance is generally very good (<−50 dB) with respect to the maximum ACF peak. However the use of a common secondary code produces a much poorer CCF performance (∼−30 dB) for code offsets within ±0.01× sequence length (=±10230 chips=±1 ms). This corresponds to the region where the secondary codes are aligned and the CCF performance is therefore limited to that provided just by the primary codes. Note that in practice the time offsets between satellites are expected to lie in the range about ±20 ms (due to propagation delays). Although the complete range of CCF offsets shown in FIGS. 2A and 2B should therefore not occur in practice, this does not exclude the regions with the high CCF peaks.

One possible approach to try to eliminate the high CCF peaks might be to deliberately offset the common secondary code in time between different satellites. However this would require code sequence time shifts of 40 ms between the different satellites, and since the maximum tiered code length is 100 ms (for pilot signals) then we can only re-use each code twice. Even if we also allow the same codes to be used for anti-podal satellites, this is still only sufficient for a total of 4 satellites and not the 30 included in the Galileo constellation.

Another possible approach would be to increase the pilot code lengths further. However, this is not considered attractive, due to the long integration times required and the corresponding impact on receiver design.

Figure 2:
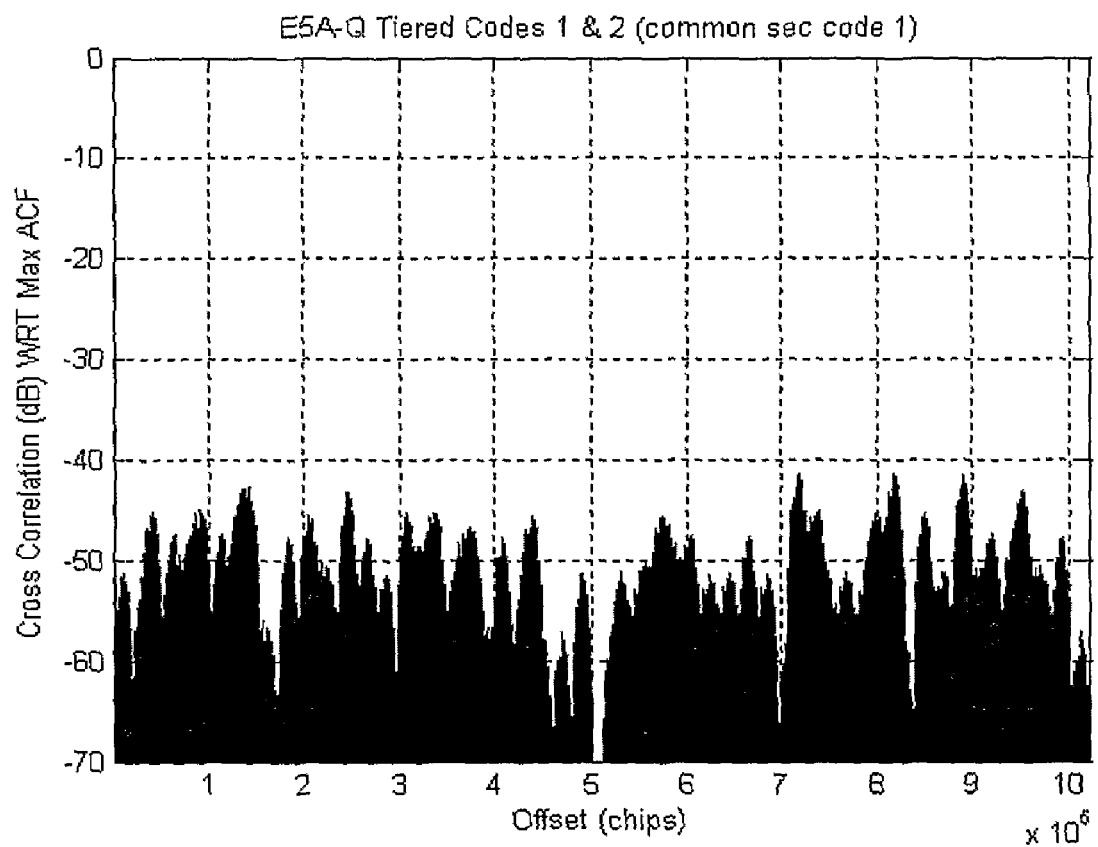
FIG. 2 illustrates simulated cross-correlation function (CCF) performance between the first two tiered spreading codes sharing a common secondary code for the Galileo E5A-Q pilot signals with a 10 Hz Doppler frequency offset.

The long pilot code sequences of 100 ms are sensitive to Doppler offsets. In fact, a Doppler offset of only 10 Hz introduces a complete cycle of phase shift onto one sequence with respect to the other, thereby causing half of the sequence to be inverted. This completely changes the CCF as can be seen in FIG. 2, which shows the CCF for the E5A-Q pilot codes using a common secondary code with a 10 Hz Doppler frequency offset. The effect of the 10 Hz Doppler offset on these E5A pilot signals reduces the worst case CCF levels from −30 to −42 dB with respect to the corresponding maximum ACF level for a single code. The distribution of Doppler frequency shifts between pairs of satellites is approximately linear up to the maximum value of 6.7 kHz for the proposed Galileo satellite constellation.

The effective chip rate of the secondary codes depends on the repetition rates of the corresponding primary codes. Since the secondary codes considered in FIG. 2 are used for the 100 ms pilot signal components, the effective chip rate is simply N×10 Hz, where N is the secondary code length, corresponding to 500 Hz and 1000 Hz for 50 bit and 100 bit secondary codes respectively. When the Doppler frequency offset is equal to these effective chip rates then the phase change per secondary code chip becomes $2\pi$, after which the Doppler effect repeats. Note that this condition does not apply for the underlying primary codes and so the CCF of the overall tiered code will not be seen to repeat at these frequency intervals.

Therefore, for tracking purposes, the combined probability of other satellites having both a relative Doppler shift below 10 Hz and a relative timing error of less than 1 ms is quite small. As a result, the overall impact of the −30 dB CCF maximum peaks is significantly reduced. (Note that for the shorter 50 bit secondary codes, the region of relevant time error increases to 2 ms, but the impact is still fairly low).

Nevertheless, during initial acquisition modes, when a wide range of frequency and time shifts have to be searched, the relatively high subsidiary CCF peaks from using common secondary codes are likely to cause undesirable false detections. This may reduce performance under difficult acquisition conditions, such as for indoor applications, where large variations between satellite signal levels can be expected.

Figure 3A:
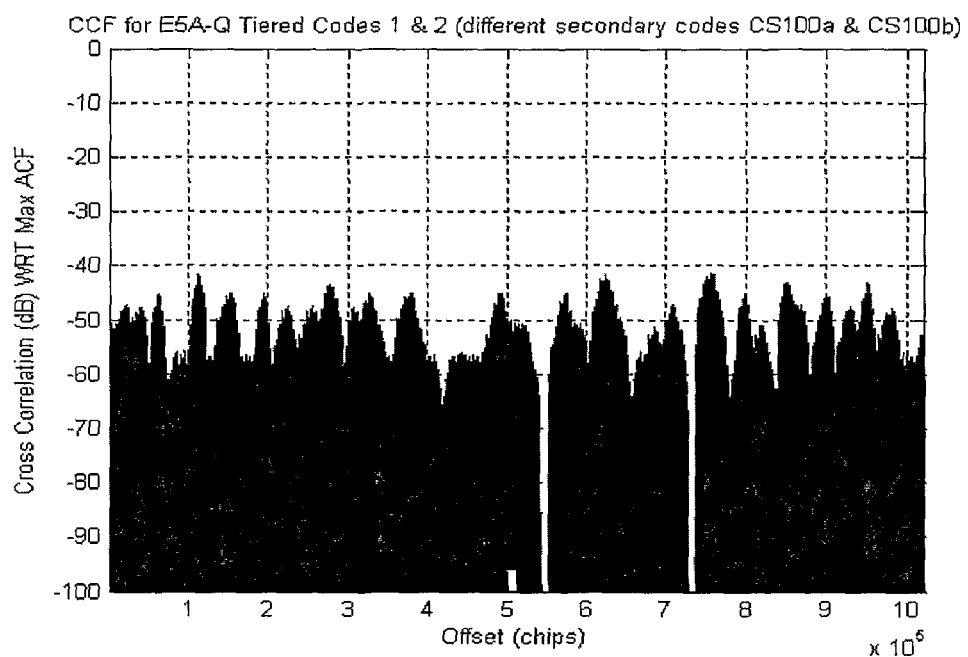
FIG. 3A illustrates simulated cross-correlation function (CCF) performance using different secondary codes for the Galileo E5A-Q pilot signals in accordance with one embodiment of the invention.

FIG. 3A illustrates how the CCF performance can be improved by using different secondary codes for each primary code. In FIG. 3A, the tiered code for E5A-Q code 1 has been modified to use the $CS_{100a}$ secondary code and the CCF re-calculated. No Doppler frequency offset is included. As can be seen, the worst case CCF side-lobes have been reduced to less than −42 dB, which is a 12 dB improvement under this zero Doppler condition.

Figure 3B:
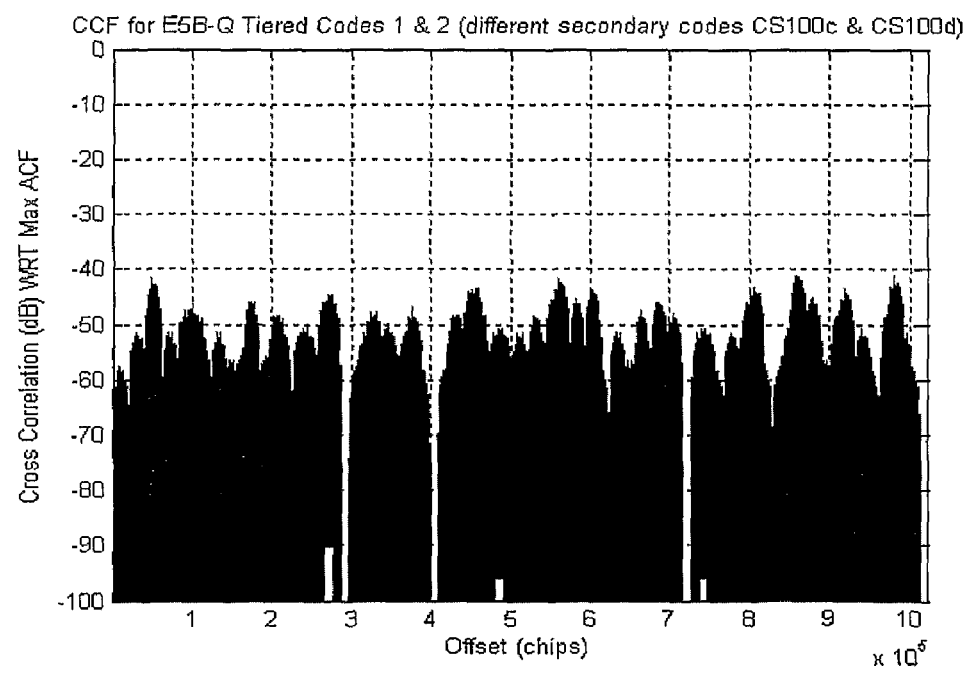
FIG. 3B illustrates simulated cross-correlation function (CCF) performance using different secondary codes for the Galileo E5B-Q pilot signals in accordance with one embodiment of the invention.

As confirmation, FIG. 3B illustrates the CCF for the E5B-Q pilot codes 1 and 2 where the secondary code for tiered code 1 has been changed to $CS_{100c}$. Again, the worst-case CCF sidelobes have been reduced to approximately −42 dB, which is the same as shown previously for the E5A pilot codes when using different secondary codes.

Figure 3C:
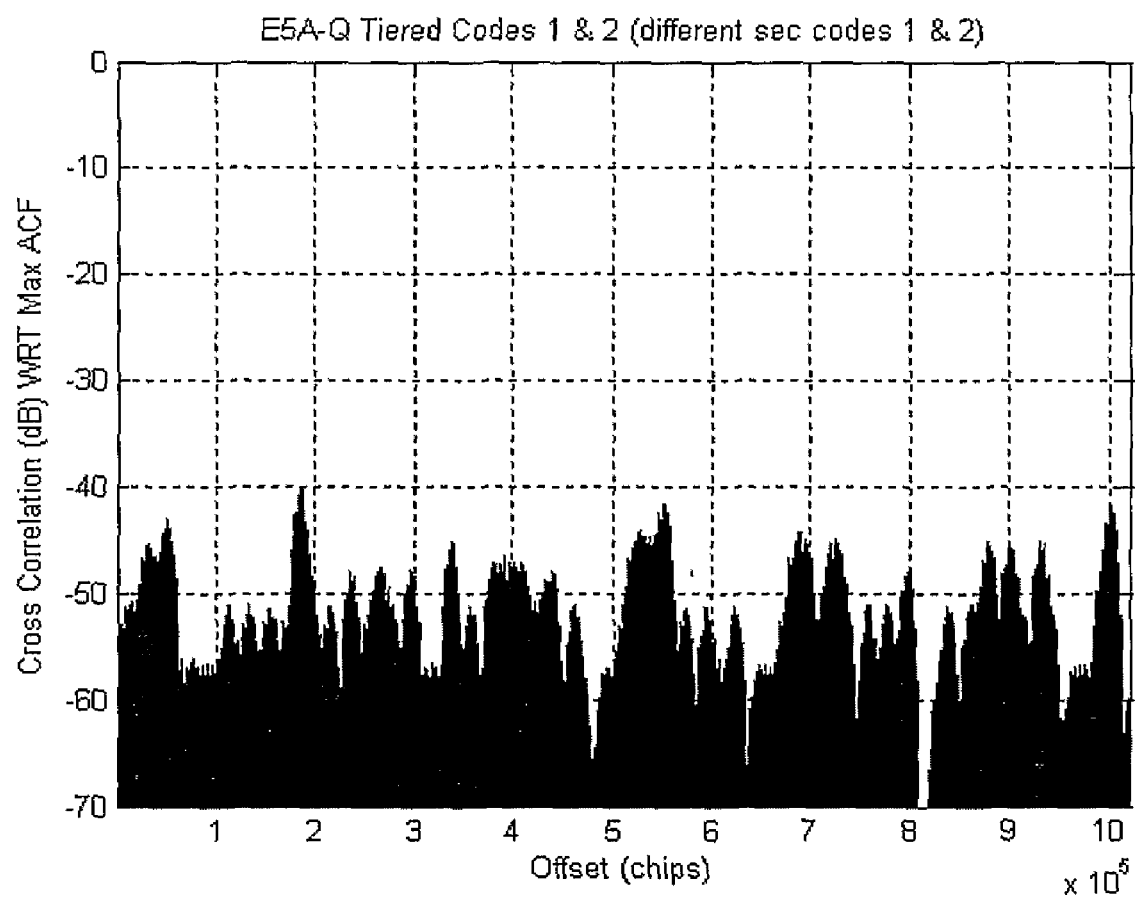
FIG. 3C illustrates simulated cross-correlation function (CCF) performance using different secondary codes for the Galileo E5A-Q pilot signals in accordance with one embodiment of the invention, with the inclusion of a 10 Hz Doppler frequency offset.

FIG. 3C depicts the CCF for the two E5A pilot signals using different secondary codes, but this time with a 10 Hz Doppler frequency offset. This shows a slightly degraded CCF performance compared to FIG. 3A, with a worst-case peak of −40 dB.

In order to use different secondary codes for different satellites, sufficient code members of suitable quality to be used with each satellite's primary code must be found. For an N bit code there are a total of $2^N$ possible code combinations, but only a limited number of these will have independent code properties. For example, each code can be inverted or reversed and will still have identical code properties; likewise each code sequence can be cyclically rotated by the number of chips in the code length and still retain identical code properties. Therefore, for an N bit code the maximum number of independent codes ($C_N$) is:

$$C_N = 2^N / (4 \cdot N)$$

(Note that this formula is approximate and represents an upper bound only, since it includes for example codes that are symmetrical, i.e. forward and reverse equal, and/or that contain repeated sequences, which are unlikely to provide useful codes). Nevertheless, the above formula can be applied to the secondary code lengths considered for the Galileo signals to estimate the number of independent codes available for the secondary codes, as listed in Table 4.

TABLE 4

Number of Independent Secondary Codes

| Secondary Code Length | Number of Independent Codes |
|---|---|
| 4 | 1 |
| 20 | 13107 |
| 25 | 335544 |
| 50 | $5.6 \times 10^{12}$ |
| 100 | $3.2 \times 10^{27}$ |

For the shorter secondary codes of 25 bits or less, it is computationally feasible with current facilities to carry out exhaustive searches of all code possibilities in order to find those with acceptable (or optimum) properties. However, for the longer 50 and 100 bit secondary codes there are too many possible codes for it to be practical to search exhaustively using current computational facilities. Nevertheless, good performance can be obtained for 50 and 100 bit baseline codes by using a random code starting point, and then performing a chip-wise optimisation process. In fact, since there are more choices available for longer codes, in general this allows more stringent optimisation or selection criteria to be applied in respect of such codes.

Figure 4:
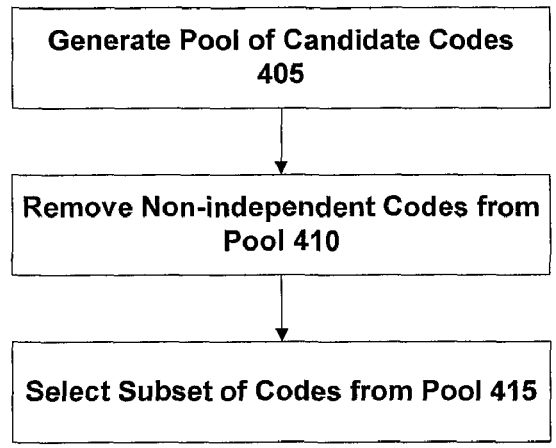
FIG. 4 is a high-level flowchart illustrating a method for generating secondary spreading codes in accordance with one embodiment of the invention.

In order to find suitable families of secondary codes, a two-stage search process as illustrated in the flowchart of FIG. 4 was adopted in accordance with one embodiment of the present invention. Firstly a pool of candidate secondary codes was found (405), where the candidates individually had good ACF, ELW and DC balance properties (as described in more detail below). Secondly, from the pool of candidate codes found, candidate codes that were not mutually independent were deleted (410), and a group or family of secondary codes having good mutual CCF properties was selected (415) (in fact several groups were selected, depending on different selection criteria).

One or more selection criteria are required in order to identify and select codes with good properties. Important parameters for such a selection are the auto-correlation function (ACF), the excess line weight (ELW) and code balance. The excess line weight (ELW) criterion is defined as the dB power ratio between the highest spreading code spectral line with respect to the overall RMS value. A code's DC balance criterion is simply the sum of all the code chips, assuming signal notation (±1) is used, and corresponds to the zero frequency (DC) component of the code spectrum.

For ACF performance, two different sub-criteria may be used. The first of these is highest neighbour value (HNV), which is an indication of the height difference between the ACF peak and the next biggest peak. In one embodiment, for the pilot codes that use long secondary codes, this criterion is defined as:

$HNVp=(N/HNV)^2$ where N=code length in chips.

The second ACF criterion is a merit factor (MF), which is determined from the average of all the ACF neighbour values.

$MFp=N^2/\Sigma NV^2$ where NV are the neighbour values.

An overall selection criterion can then be defined as follows:

Performance=HNVp+MFp/100−ELW

Although the code balance criterion doesn't appear directly within this overall performance parameter, it is used to reject all codes where:

|DC balance|>√N where N=code length in chips.
(Note that this threshold is the average DC value to be expected for a random code sequence).

Using these criteria, Table 5 shows the performance for the 50 and 100 bit secondary codes from Table 3. Note that the actual ACF HNVs are 6 for the 50 bit codes and 8 for the 100 bit secondary codes.

TABLE 5

Galileo Baseline 50 & 100 Bit Secondary Code Performance

| Code | Signal | Perf. | HNVp | MFp | ELW (dB) | DC Bal |
|---|---|---|---|---|---|---|
| CS50a | E6-C | 67.16 | 69.44 | 9.62 | 2.38 | 0 |
| CS50b | — | 66.41 | 69.44 | 3.88 | 3.07 | −4 |
| CS100a | — | 153.67 | 156.25 | 6.94 | 2.65 | −10 |
| CS100b | E5A-Q | 154.05 | 156.25 | 8.22 | 2.29 | −6 |
| CS100c | — | 153.92 | 156.25 | 7.18 | 2.40 | −4 |
| CS100d | E5B-Q | 154.55 | 156.25 | 7.02 | 1.77 | −8 |

Figure 5:
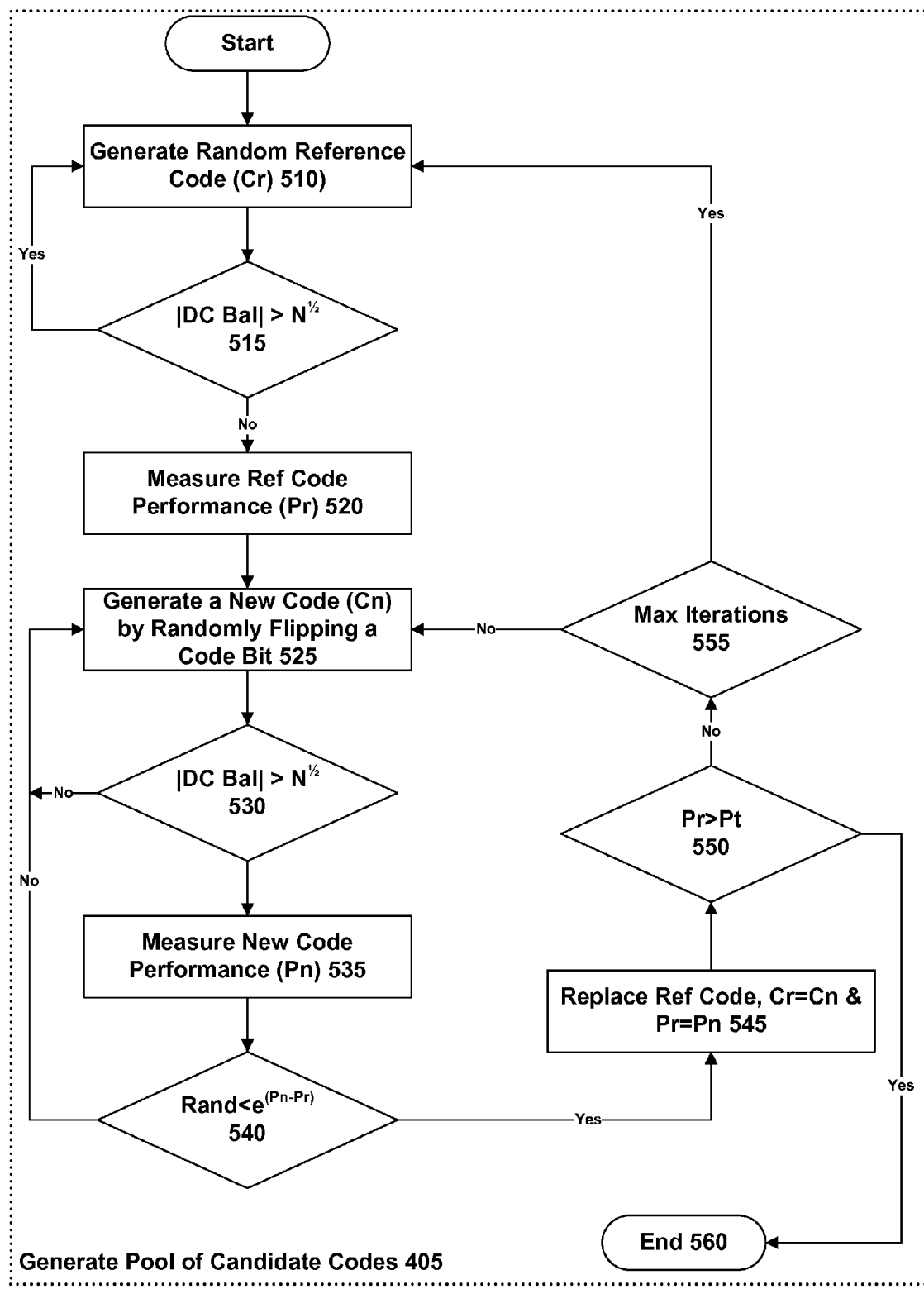
FIG. 5 is a flowchart illustrating part of the method of FIG. 4 in more detail in accordance with one embodiment of the invention.

As stated earlier the number of possible codes for the longer 50 and 100 bit secondary codes is too great for exhaustive search techniques with currently available computational facilities (although of course this may change in the future). Therefore an optimisation process, as shown in the flowchart of FIG. 5, has been used to obtain a final set of candidate secondary codes from an initial random code selection in accordance with one embodiment of the invention (this corresponds to operation 405 from FIG. 4).

To start the process a random reference binary code (Cr) of the required length (N bits) is generated (510). First the modulus of the code's DC balance value is tested to check whether it exceeds the square root of the number of code bits (515). If this is the case then the code is rejected, and another random code is generated instead. When an acceptably balanced code is found its performance is calculated as a reference value (Pr) (520). Note that the optimisation process used in the method of FIG. 5 tries to maximise a performance-related factor, although other embodiments may instead seek to minimise some sort of cost function (for present purposes these can generally be regarded as the same thing).

Next one or more bits of the reference code are randomly inverted to produce a new code (Cn) (525). The number of bits inverted controls the "step" size through the search space. One approach is to invert a relatively large number of bits initially, corresponding to big steps through the search space when presumably the algorithm is a long way from a maximum, and then to invert a smaller number of bits at later iterations as the maximum is approached, in order to perform a more fine-grained search. In the present circumstances, it was generally found acceptable to invert only a single bit each time for operation 525. This is still a 1% change in the sequence (for a 100 chip sequence), and so does not lead to unduly slow convergence.

It is now tested whether the new code fails the DC balance criterion (530). If so, the new code is rejected, and we return to operation 525 to generate a new code by flipping a random bit (or bits) of code Cr (not of code Cn).

Assuming however that code Cn does fulfil the DC balance criterion at operation 530, the performance of the new code Cn is measured as Pn (535). An optimisation decision process is then performed (540) to test whether a random number selected linearly from the range (0<Rand<1) is less than the exponent of the delta in performance value between the new code and the reference code, i.e. [exp(Pn−Pr)]. If the test of operation 540 is false, the code Cn is rejected, and we return to operation 525 to generate a new code by flipping a random bit (or bits) of code Cr (not of code Cn). Alternatively, if the test of operation 540 is true, then the new code is adopted as the current code (545), whereby Cr becomes equal to Cn, and Pr is set equal to Pn.

Note that if Pn>Pr at operation 540, then code performance has been improved by the bit change at operation 525. In this case that the test of operation 540 is necessarily positive, leading to a code replacement at operation 545 (since the random test number cannot be greater than unity). However, even if Pn<Pr, indicating that the performance of the new code is in fact worse than the performance of the old code, there is still a certain probability (exponentially decreasing) for the test of operation 540 to give a positive outcome, leading to a code replacement at operation 545. This facility can help the system to avoid becoming trapped in a local maximum, since it allows the optimisation in some circumstances to move away from the (local) maximum.

Note that the sensitivity of the decision process can be modified by multiplying the delta performance value (Pn−Pr) by a sensitivity factor in operation 540 (this is analogous to varying the temperature in a related 'simulated annealing' search method). The sensitivity factor may be modified between iterations if appropriate. However, for the code searches described herein, a fixed factor of unity has been found to be satisfactory, as shown in FIG. 5.

A test is now made to see whether a target performance (Pt) has been achieved (550). If so, a suitable secondary code has been located, and the search can terminate (560). In one embodiment, the target performance level (Pt) is set to approximately that of the worst baseline secondary code (from Table 3). Alternatively, if the test at operation 550 determines that the performance threshold is not exceeded, processing returns to operation 525 to flip a random additional bit of the (modified) code. Note that this loop back is subject to testing for a maximum number of iterations (555), which in one embodiment is set to 1 million. If this limit is reached, then there may be a problem with convergence, and it is decided to return to operation 510 to generate a completely new random reference code Cr.

It will be appreciated that the flowchart of FIG. 5 is presented by way of illustration only, and the skilled person will be aware of many potential variations and modifications. For example, rather than flipping a single bit at operation 525, the procedure might randomly select a 0 and a 1 from the code to flip. This would then ensure that the balance of the code was maintained. In addition, the optimisation strategy may take into account one or more other criteria (in addition to or instead of those already discussed). For example, one possibility would be to require that the first side-lobe (i.e. corresponding to a bit shift of one place) of the auto-correlation function (ACF) is zero for each code. This is a useful property since it ensures that the ACF has a known (fixed) behaviour in the vicinity of zero-offset, which can help with strategies to mitigate multipath effects. In addition, the optimisation procedure may not necessarily exit once a given performance threshold has been reached (at operation 550), but may continue for at least some further iterations to try to find an even better bit pattern.

The procedure illustrated in FIG. 5 was used to search for suitable 50 and 100 bit secondary codes. Note that at this stage the mutual CCF properties between codes were not taken into account. The list of all codes found from the procedure of FIG. 5 was then checked to ensure that it only included independent codes (corresponding to operation 410 in FIG. 4). In particular, any inverse, reverse or cyclically shifted codes discovered were removed. (Several repeated codes were in fact found and rejected while searching for suitable 50 bit secondary codes, but no such repeats were found during the 100 bit code length searches, probably due to the much greater search space).

Table 6 shows the range of performance values over the 100 best 50 bit secondary codes that were found using the search procedure of FIG. 5, The 100 codes were selected from a total of 1304 codes that were found to have exceeded the performance threshold Pt (although this is not expected to be exhaustive).

TABLE 6

Summary of 50 Bit Secondary Code Search Results

| Code | Perf. | HNVp | MFp | ELW | DC Bal |
|---|---|---|---|---|---|
| $CS50_1$ | 623.80 | 625.00 | 12.76 | 1.33 | 0 |
| $CS50_2$ | 623.80 | 625.00 | 12.76 | 1.33 | −6 |
| ~ | ~ | ~ | ~ | ~ | ~ |
| $CS50_{99}$ | 623.37 | 625.00 | 12.76 | 1.76 | −2 |
| $CS50_{100}$ | 623.37 | 625.00 | 12.76 | 1.76 | −2 |

By way of comparison, the current baseline 50 bit secondary codes CS50a and CS50b from Table 3 are in positions 1146 and 1294 respectively out of the total 1304 secondary codes located. Note that the top 324 codes found have ACF HNVs of only 2, which is much better performance than the two original reference codes that have HNVs of 6.

Similarly, Table 7 shows the range of performance values over the 200 best 100 bit secondary codes out of the 981 that were found that exceeded the performance threshold. In this case the top 200 codes are selected, since codes of this length are intended for both the E5A-Q and E5B-Q pilot signals. Note that the second best code in Table 7 is the current CS100d reference code from Table 3, while the other baseline codes CS100a-c are in positions 981, 980 and 733 respectively.

TABLE 7

Summary of 100 Bit Secondary Code Search Results

| Code | Perf. | HNVp | MFp | ELW | DC Bal |
|---|---|---|---|---|---|
| $CS100_1$ | 154.60 | 156.25 | 8.12 | 1.73 | 4 |
| $CS100_2$ | 154.55 | 156.25 | 7.02 | 1.77 | −8 |
| ~ | ~ | ~ | ~ | ~ | ~ |
| $CS100_{199}$ | 154.29 | 156.25 | 5.53 | 2.01 | 8 |
| $CS100_{200}$ | 154.29 | 156.25 | 5.21 | 2.01 | 6 |

The preceding codes were all selected without testing CCF performance. The next step is therefore to select, from the complete sets of secondary codes found, a group of at least 50 codes (for each signal) that also have good mutual CCF properties. However, it should be noted that this performance should not be worse than the current situation, where all code members use the same (common) secondary code.

To test all combinations of any 100 codes from a pool of just a few hundred candidates is not feasible using currently available computational facilities, especially when allowing for various Doppler shifts (which will effect the CCF performance between different satellite codes). Accordingly, another optimisation process was performed.

In one embodiment, two methods, both using the same optimisation procedure, were utilised. Each of these methods starts with a randomly selected set of 100 codes chosen from the pool of approximately 1000 codes found through the method of FIG. 5 (as described above). The two methods then replace one of the codes for each iteration, either by a random choice for one method, or by identifying the code that provided the worst CCF contribution for the other method. However, in this embodiment, it was found to be relatively hard to optimise (converge) the overall family CCF, especially when including Doppler shift effects, since the iteration rate was slow and the search program regularly got stuck in local maxima. In particular, the delta impact of changing a single code could be swamped by overall family CCF performance variations. One factor affecting speed was that the search program was continually re-calculating almost the same CCFs for every iteration, although in fact only the CCFs involving the replaced code actually need to be computed for a new iteration. The search program was therefore modified to support this change in order to speed up the iteration rate. Attempts were also made to improve the sensitivity to individual code changes by tuning the performance criteria; nevertheless, the rate of convergence remained rather slow.

In another embodiment, a rather different approach was taken. In this embodiment, the CCFs of all code pair combinations for the complete pool of codes were computed. The matrix of computed CCFs also included a range of Doppler frequency offsets, namely 25 steps, each of 20 Hz, for the 50 bit secondary codes, and 50 steps, each of 20 Hz, for the 100 bit secondary codes. These produced maximum shifts of 500 Hz and 1000 Hz for the 50 bit and 100 bit secondary codes respectively, which match the repetition rates of the corresponding primary codes. At these frequency offsets the phase change per secondary code chip becomes $2\pi$, after which the Doppler effect on the secondary codes repeats as previously discussed.

Although this embodiment utilises a large amount of memory or storage, it avoids the repetition of time-consuming CCF calculations. The subsequent optimisation process is then much faster, since it only involves finding the best set of codes using the pre-computed CCF values and one or more suitable criteria that combine the family of CCF values. For example, code groups may be constructed by eliminating codes that are seen to have poor CCF values, or by selecting codes that have good CCF values.

In one embodiment, the CCF optimisation criteria adopted concentrate on the tracking performance, since the pool of codes have already been optimised on an individual basis for ACF properties, which drive the acquisition performance. Three different performance criteria were defined, based on a merit factor (MF) approach, including crosstalk (CT) and multipath (MP) variants. Two crosstalk merit factor criteria (CT1 & CT2) were used. The CT2 criteria takes into account that the time offset between satellites cannot exceed 20 ms and therefore does not need to include the full range of possible offsets up to the pilot code length of 100 ms. The third criteria (MP) uses a multipath variant of the merit factor. These criteria were employed by the optimisation algorithm to produce several code groups. For reference purposes, the first code group(s) included repetitions of the common baseline secondary code. Another code group used the top set of codes from each pool of codes.

The various merit factors used are formally defined as follows:

$$\text{For } CT1: MF = \left(\frac{N}{\max\{CCF\}}\right)^2 + \frac{1}{100}\left(\frac{N^2}{\sum CCF^2}\right)$$

For $CT2$:

$$MF = \frac{50}{N} \times \left|\max\{CCF_{\pm 20ms}\} + \left[\sum (CCF_{\pm 20ms})^n\right]^{\frac{1}{n}} - (2 \times N)\right|$$

$$\text{For } MP: MF = \left(\frac{N}{\max\{ACF\}}\right)^2 + \frac{1}{100}\left(\frac{N^2}{\sum ACF^2}\right) - ELW$$

Figure 6A:
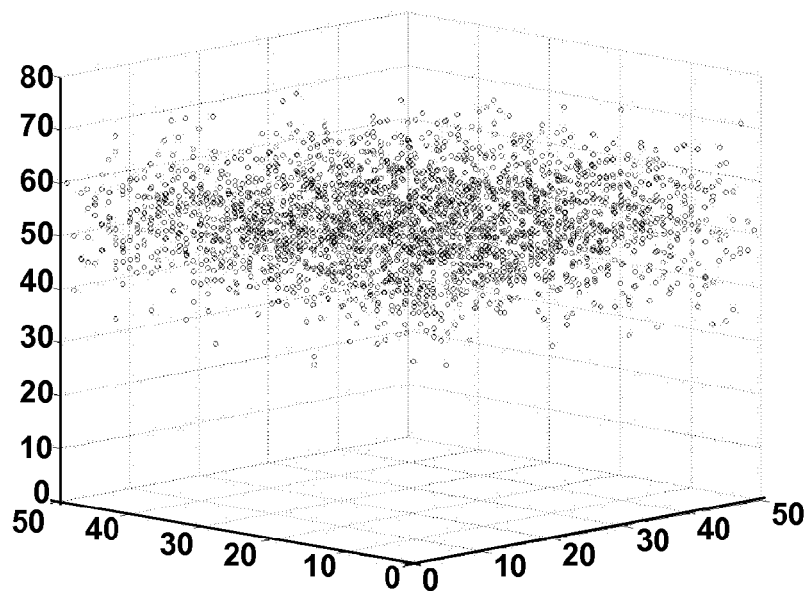
FIG. 6A is a plot of CCF performance for a 50 member group of secondary codes for zero Doppler shift generated in accordance with one embodiment of the invention.
Figure 6B:
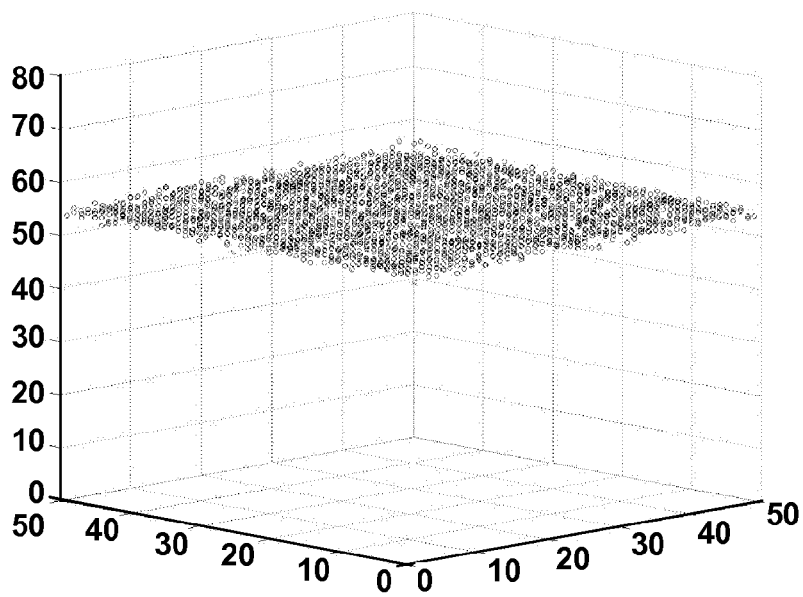
FIG. 6B is a plot of CCF performance for the same 50 member group of secondary codes generated in accordance with one embodiment of the invention as shown in FIG. 6A, but averaged across a range of Doppler shifts.

FIG. 6A presents a typical plot of the CCF performance, using the CT2 criteria, for a 50 member code group of 50 bit secondary codes with zero Doppler. This plot is repeated in FIG. 6B for the same code group, but showing the average CCF across all Doppler frequency offsets. Note that the randomizing effect of the Doppler shift tends to smooth the overall CCF to a value much less dependent on specific code structure.

Table 8 summarises the results of the code set selection procedure for 12 different 50 bit secondary code groups G1 to G12, which each contains 50 code members.

TABLE 8

50 Bit Secondary Code Group Optimisation Results

| Code Group | Type | CT1 | CT2 | MP | Rank |
|---|---|---|---|---|---|
| G1 | CS50a | 4.0000 | 29.0135 | 67.1600 | 12 |
| G2 | Top 50 | 9.9617 | 53.0550 | 623.7488 | =4 |
| G3 | | 9.9794 | 53.2278 | 556.8858 | 3 |
| G4 | | 10.0509 | 53.3473 | 189.6056 | =4 |
| G5 | | 10.6094 | 53.5636 | 134.0602 | 1 |
| G6 | | 10.0581 | 53.1717 | 111.8202 | 8 |
| G7 | | 10.0548 | 53.1057 | 200.8360 | =4 |
| G8 | | 10.0597 | 53.5013 | 66.9624 | =4 |
| G9 | | 9.9264 | 52.6201 | 211.8780 | 11 |
| G10 | | 9.9541 | 54.5136 | 212.0222 | 2 |
| G11 | | 9.9560 | 52.9145 | 200.8334 | 10 |
| G12 | | 9.9324 | 53.4461 | 178.5948 | 9 |

The first group G1 is a dummy group based on the same (common) baseline code CS50a, which indicates the reference performance level if only a single common secondary code is used. The next group G2 contains the top 50 codes from the secondary code search list of Table 6. The following 10 groups G3 to G12 were generated by optimising with respect to the three different CCF selection criteria described previously.

The three main columns in Table 8 (CT1, CT2 & MP) represent the results using the different crosstalk and multipath criteria. For these results the higher values represent better performance. An overall rank is shown in Table 8, determined by combining the individual ranks for each criterion. Note that common code (group G1) is ranked last, and produces the worst score for each individual criterion. Code group G5 is ranked first. A further assessment of these 50 bit secondary codes using a code evaluation tool is described below.

(It will be appreciated that since the ranking process of Table 8 includes two crosstalk criteria, this reduces the relative influence of the multipath criterion. This may or may not be appropriate, depending upon the intended use and circumstances of the signals).

Table 9 summarises analogous results for 13 different groups G1 to G13, each containing 137 secondary codes of 100 bits.

TABLE 9

100 Bit Secondary Code Group Optimisation Results

| Code Group | Type | CT1 | CT2 | MP | Rank |
|---|---|---|---|---|---|
| G1 | CS100d | 5.0000 | 30.5621 | 154.5500 | 11 |
| G2 | CS100b | 5.0000 | 29.9568 | 154.0500 | 13 |
| G3 | Top 137 | 16.7965 | 56.7422 | 154.3734 | 6 |
| G4 | | 16.8524 | 56.7141 | 154.2950 | =8 |
| G5 | | 16.8628 | 56.7248 | 154.1616 | =8 |
| G6 | | 17.2517 | 56.8618 | 154.1400 | 3 |
| G7 | | 17.0044 | 56.8088 | 154.1450 | 4 |
| G8 | | 16.8753 | 56.7304 | 154.1726 | 5 |
| G9 | | 16.8454 | 56.8210 | 154.3097 | 2 |
| G10 | | 16.8283 | 56.4425 | 154.1422 | 12 |
| G11 | | 16.9215 | 57.1402 | 154.1607 | 1 |
| G12 | | 16.8834 | 56.7341 | 154.1596 | 7 |
| G13 | | 16.8064 | 56.8063 | 154.1599 | 10 |

The first two groups of Table 9, G1 and G2, are dummy groups based on common baseline codes CS100d and CS100b respectively. These groups are therefore indicative of reference performance levels where only a single common secondary code is used. The next group G3 contains the top 137 codes from the secondary code search list. The following 10 groups G4 to G13 were generated using a CCF optimisation process analogous to that for the 50 bit code groups. As for the 50 bit code group evaluation, an overall rank has been included by combining the individual ranks for each criterion. Again, the common codes (groups G1 & G2) are ranked poorly and occupy 2 of the worst 3 positions. Code group G11 is ranked first. A further assessment of the 100 bit secondary codes using a code evaluation tool is provided below.

Although the procedure described above in connection with FIGS. 4 and 5 is based on a two-phase approach, namely firstly identifying a set of good individual codes (operation 405), and secondly identifying good groups within this set (operation 415), a single integrated procedure might be used instead. For example, this might involve randomly generating a group of codes, and then performing an optimisation process on this group that takes into consideration both the individual properties of the codes, and also the mutual properties of different codes in the group (especially their cross-correlation function). There is a range of alternative strategies available for such a task, based on concepts such as genetic algorithms, simulated annealing, and so on. For example, if there are N code patterns in the final group, then a set of P code patterns might be generated initially (P>N). Each optimisation cycle could then involve retaining the best subset of (say) N code patterns, and then generating another P−N new code patterns for testing in conjunction with the retained subset from the previous cycle. Some optimisation strategies may combine this selection from a larger population with updating individual code patterns within the population (as per operation 525).

In assessing the codes groups identified in Tables 8 and 9, it will be appreciated that the two main criteria for code design are performance under acquisition and tracking modes of operation. Within these two modes one can distinguish two further performance aspects, namely the suppression of delayed versions of the same code (multipath case), and the rejection of all other satellite codes (crosstalk case). Any performance assessment should include the effects of Doppler frequency shift, as appropriate. One or more additional criteria relating to the code's spectral properties may also be adopted.

For acquisition, the codes' ACFs (multipath case) or mutual CCFs (crosstalk case), with allowance for Doppler offset, may be used as performance criteria. These can then be compared to the appropriate Welch bound (WB) for the code length and code family size. These criteria measure the Average Mean Excess Welch Square Distance (AMEWSD) for the multipath and crosstalk cases. For the multipath case, only a limited range of Doppler shifts are normally tested, since only one satellite code is considered, and this represents the expected range of acquisition search frequency bin error. However in the crosstalk case, which includes other satellite codes, a maximum value of 6.7 kHz Doppler shift has to be taken into account. Note that both these criteria take into account the effects of even and odd correlation.

For tracking purposes, the codes' ACFs (multipath case) or mutual CCFs (crosstalk case) may be used directly to provide an Average Merit Factor (AMF) measure of performance. As for the acquisition tests, the multipath case may be restricted to a limited range of Doppler frequency shifts. In addition, the ACF is only evaluated for time offsets of ±1 and ±2 chips, to reflect the limited range of multipath delays expected while tracking a signal. This range of time offsets is not strictly relevant for the slow secondary codes on their own.

It is also desirable for the codes to have a flat spectrum, similar to random noise. The presence of strong spectral lines increases cross-talk between codes, as well as susceptibility to external narrowband interference. The criteria used here measure the Average Excess Line Weight (AELW) with respect to the equivalent spectral power for a random code.

A code evaluation tool based on the five test criteria mentioned above was used to test the secondary code proposals from Tables 8 and 9. The tool performs two types of calculation, namely multipath (MP) and crosstalk (CT), involving one code and a code pair respectively. In theory for testing the secondary codes, the evaluation tool should be run with the complete sets of tiered codes. However this is not feasible with currently available computational resources, and so the secondary codes were tested on their own. This approach is reasonable since the CCF performance of a tiered code can be seen to be the product of the individual primary and secondary codes, and it also avoids the need to specify the primary codes themselves or the assignment of a particular primary code to a particular secondary code, which may both be subject to change.

Table 10 summarises the results for the 12 different 50 bit secondary code groups G1 to G12 from Table 8, which each contains 50 code members.

TABLE 10

50 Bit Secondary Code Group Evaluation Results

| Code Group | Type | MEWSD CT | MEWSD MP | MF CT | MF MP | ELW | Rank |
|---|---|---|---|---|---|---|---|
| G1 | CS50a | 0.6933 | 0.6933 | 1.3803 | — | 2.9595 | 12 |
| G2 | Top 50 | 0.1346 | 0.6789 | 1.0069 | — | 4.9600 | 9 |
| G3 |  | 0.1340 | 0.6783 | 1.0079 | — | 4.2627 | 8 |
| G4 |  | 0.1336 | 0.6851 | 1.0051 | — | 1.8422 | 6 |
| G5 |  | 0.1287 | 0.6803 | 1.0009 | — | 1.5997 | 1 |
| G6 |  | 0.1337 | 0.6813 | 1.0061 | — | 1.1732 | =3 |
| G7 |  | 0.1342 | 0.6830 | 1.0063 | — | 1.8302 | 7 |
| G8 |  | 0.1329 | 0.6846 | 1.0033 | — | 1.0411 | 2 |
| G9 |  | 0.1380 | 0.6807 | 1.0147 | — | 1.8349 | 10 |
| G10 |  | 0.1325 | 0.6839 | 1.0014 | — | 2.0446 | 5 |
| G11 |  | 0.1346 | 0.6897 | 1.0076 | — | 1.7825 | 11 |
| G12 |  | 0.1336 | 0.6817 | 1.0006 | — | 1.9106 | =3 |

The five main columns (MEWSD-CT&MP, MF-CT&MP and ELW) represent the results from the code evaluation tool. These are all computed as cost functions where the lowest values represent the best performance. (The tool does not provide any answers for the merit factor multipath (MF–MP) case—this appears to be due to the short length of the secondary codes being evaluated). Note that the values of MEWSD-CT and MEWSD-MP are computed in accordance with the following definitions:

$$AC_{pp}(l, f_{off}) = \frac{1}{n} \sum_{k=0}^{n-1} (a_k)_p (a_{k-l})_p e^{2\pi i \frac{f_{off}}{f_s} k}$$

$$CC_{pq}(l, f_{off}) = \frac{1}{n} \sum_{k=0}^{n-1} (a_k)_p (a_{k-l})_q e^{2\pi i \frac{f_{off}}{f_s} k}$$

$$MEWSD_{MP} = \text{mean}\left\{ \sum_{n_{f_{off}}} \frac{1}{2} \left\{ \sum_{\substack{l=1 \\ AC^e(l,f_{off}) > WB}}^{n-1} (AC^e(l, f_{off}) - WB)^2 + \sum_{\substack{l=1 \\ AC^o(l,f_{off}) > WB}}^{n-1} (AC^o(l, f_{off}) - WB)^2 \right\} \right\}$$

$$MEWSD_{CT} = \text{mean}\left\{ \sum_{n_{f_{off}}} \frac{1}{2} \left\{ \sum_{\substack{l=1 \\ AC^e(l,f_{off}) > WB}}^{n-1} (CC^e(l, f_{off}) - WB)^2 + \sum_{\substack{l=1 \\ AC^o(l,f_{off}) > WB}}^{n-1} (CC^o(l, f_{off}) - WB)^2 \right\} \right\}$$

As previously determined with respect to Table 8, the best 50 bit secondary code group is G5, while the reference set G1 is the worst. Note that the G5 set comes within the best 3 groups for all criteria.

Table 11 summarises the results for the 13 different 100 bit secondary code groups G1 to G13 from Table 9, which each contains 137 code members.

TABLE 11

100 Bit Secondary Code Group Evaluation Results

| Code Group | Type | MEWSD CT | MP | MF CT | MP | ELW | Rank |
|---|---|---|---|---|---|---|---|
| G1 | CS100d | 0.5604 | 0.5604 | 1.2241 | — | 0.8231 | 12 |
| G2 | CS100b | 0.5367 | 0.5367 | 1.1881 | — | 0.9975 | =6 |
| G3 | Top 137 | 0.1123 | 0.5465 | 1.0025 | — | 1.1874 | 8 |
| G4 | | 0.1117 | 0.5476 | 1.0018 | — | 1.4235 | =6 |
| G5 | | 0.1114 | 0.5469 | 1.0010 | — | 1.8527 | 3 |
| G6 | | 0.1106 | 0.5483 | 1.0021 | — | 1.9435 | 10 |
| G7 | | 0.1112 | 0.5468 | 1.0010 | — | 1.9876 | 4 |
| G8 | | 0.1118 | 0.5482 | 1.0021 | — | 1.7864 | 11 |
| G9 | | 0.1116 | 0.5464 | 1.0016 | — | 1.3836 | 2 |
| G10 | | 0.1121 | 0.5490 | 1.0027 | — | 1.9751 | 13 |
| G11 | | 0.1110 | 0.5463 | 1.0007 | — | 1.8404 | 1 |
| G12 | | 0.1115 | 0.5471 | 1.0013 | — | 1.9000 | 5 |
| G13 | | 0.1118 | 0.5479 | 1.0013 | — | 1.8667 | 9 |

(As for the 50 bit code tests, the tool did not produce any results for the merit factor multipath (MF–MP) criterion). Matching the results shown in Table 9, the best 100 bit secondary code group is found to be G11. The first reference set G1 (common CS100d code) is worst for all criteria except the ELW. The second reference set G2 (common CS100b code) performs better at equal $6^{th}$ place, which can be attributed to having the best performance in the MEWSD multipath criterion.

In summary therefore, a process has been described for optimising secondary codes, especially for those codes used as part of the long tiered codes for the pilot signal components. Previous Galileo baseline code specifications have adopted a common secondary code for all primary code family members, but this produces relatively high CCF sidelobes where the signal delay between satellites is less than a few ms. Since this problem is only serious for low Doppler frequency offsets between satellites, it will mainly degrade acquisition performance. The CCF sidelobes can be significantly reduced by the use of independent secondary codes for each primary code member.

A two-stage optimisation procedure has been utilised to find suitable groups of 50 bit and 100 bit secondary codes, since these relatively long secondary codes are expected to yield sufficient suitable codes, allowing for the number of satellites in the Galileo system. The first stage located codes with good ACF and ELW properties, comparable with or better than the original baseline codes. This produced approximately 1000 candidates for both the 50 and 100 bit secondary codes.

The second stage then selected a suitable group of codes with good mutual CCF properties from the overall pool of codes found. In fact several groups were selected depending on various optimisation criteria. These groups were then compared against each other by a code evaluation tool using an agreed (predetermined) set of performance criteria.

For the 50 bit secondary codes, a particular code group (G5, see Table 8) is recommended. This group contains 50 different codes, which can be assigned to the different satellites, rather than using a common secondary code as per the previous baseline proposal for the E6-C pilot signal (although as previously mentioned, the primary code intended for the E6-C pilot signal has now been shortened, so that the length of the corresponding secondary code will in fact be increased from 50 bits to 100 bits).

For the 100 bit secondary codes, a particular code group (G11, see Table 9) is recommended, specifically to replace the use of the common secondary code CS50d for the E5A-Q pilot signal component and the common code CS50b for the E5B-Q pilot signal component. The code group G11 contains 137 compatible codes allowing the allocation of 50 codes for both E5A and E5B pilot signal components, plus an additional 37 codes that could be assigned to the GPS L5 pilot signal. With the change to the E6-C pilot signal, these 100 bit secondary codes may be used for this signal as well.

The Galileo L1-C signal component currently uses a tiered pilot code with a common 25 bit secondary code. The procedure described herein should allow sufficient codes to be identified for this shorter secondary code length that would allow the use of independent secondary codes for different satellites, and this in turn should lead to consequential performance improvements.

It will be appreciated that the number of codes to be included within a given code set is dependent upon the particular requirements of the relevant satellite navigation system. Such systems are generally designed to operate with some 24-30 different satellites, usually with one or more additional satellites as potential spares in case of failure. The desired number of codes within a code set may be further increased to accommodate "pseudolite" signals. These are signals emitted from ground locations, for example near airports, that appear to a receiver as additional satellite navigation signals, and so can give more precise and reliable position determination in such locations.

In addition, in some circumstances, it may be desired to change the set of spreading codes broadcast from a satellite on a regular basis. This can be useful for security or commercial reasons, for example where access to the new codes is conditional upon payment of a license fee, or is restricted to certain sets of government or military users. If the spreading codes are changed from time to time, then a larger number of codes sets is required. Note however that with a tiered code construction, the code changes may potentially be implemented just by changing the primary codes, while maintaining the same secondary code through the change.

Figure 7:
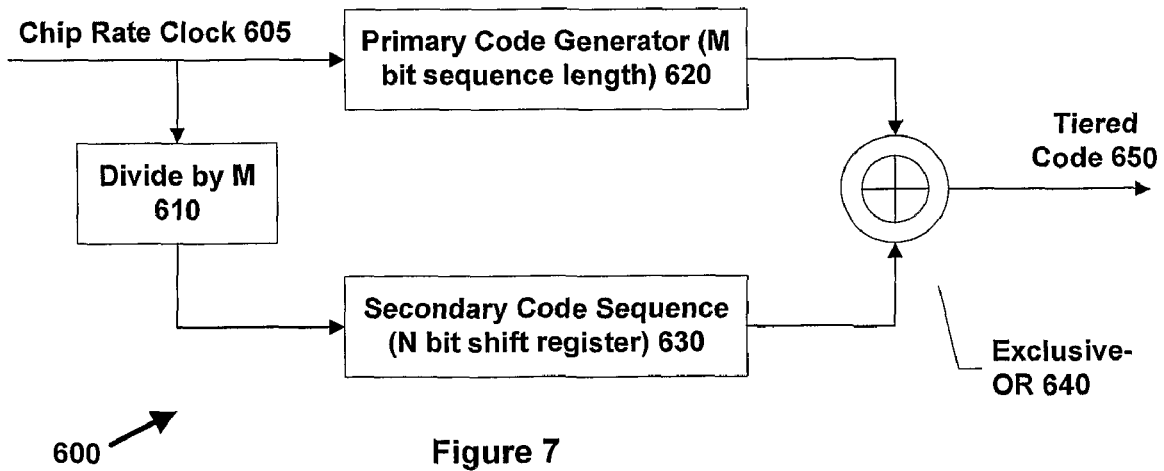
FIG. 7 is a high-level schematic diagram of a subsystem for generating a tiered code in accordance with one embodiment of the invention.

FIG. 7 is a high-level schematic diagram of a subsystem 600 for generating a tiered spreading code in accordance with one embodiment of the invention. Note that subsystem 600 may be incorporated into a satellite to generate a spreading code for transmission to earth. In addition, subsystem 600 may be incorporated into a receiver for detecting a satellite signal, for example by cross-correlating the signal incoming to the receiver with the output from subsystem 600.

In operation, the N-bit secondary code for the spreading code is loaded into shift register 630. Prior to this, the secondary code may be stored in some non-volatile storage device (not shown), for example a form of ROM or EEPROM (such as flash memory). Alternatively, the secondary code may be utilised directly from the storage device (i.e. without first loading into a shift register). The secondary code sequence available from shift register 630 is specific to the relevant satellite for subsystem 600.

Component 620 is used to generate an M-bit primary code. In some embodiments, component 620 may be a linear feedback shift register (LFSR), such as used for generating a Gold code for GPS signals. Alternatively, the complete M-bit primary code may also be stored in some form of storage device, for example a ROM or EEPROM (such as flash memory). This latter option is particularly appropriate where the primary code comprises some form of random bit code, rather than a pseudo-random sequence that can be (re)generated by appropriate logic.

The primary code generator 620 receives a clock signal 605 at the signal chip rate, and outputs the next bit of the primary code in response to this clock signal. The clock signal 605 is also passed through a divide by M unit 610 before being passed to the secondary code unit 630. Consequently, the secondary code sequence progresses a single bit for each complete cycle through the primary code. The output for the secondary code is then combined using an exclusive-OR operation 640 with the output for the primary code to produce the tiered code 650.

Note that in some implementations, subsystem 600 may only be used for the initial code generation, such as during satellite or receiver manufacture. The tiered code 650 would then be stored as a single (flat) bit sequence in the satellite and/or receiver, despite having an underlying hierarchical structure. Such an approach might be useful for simplifying overall hardware design.

Figure 8A:
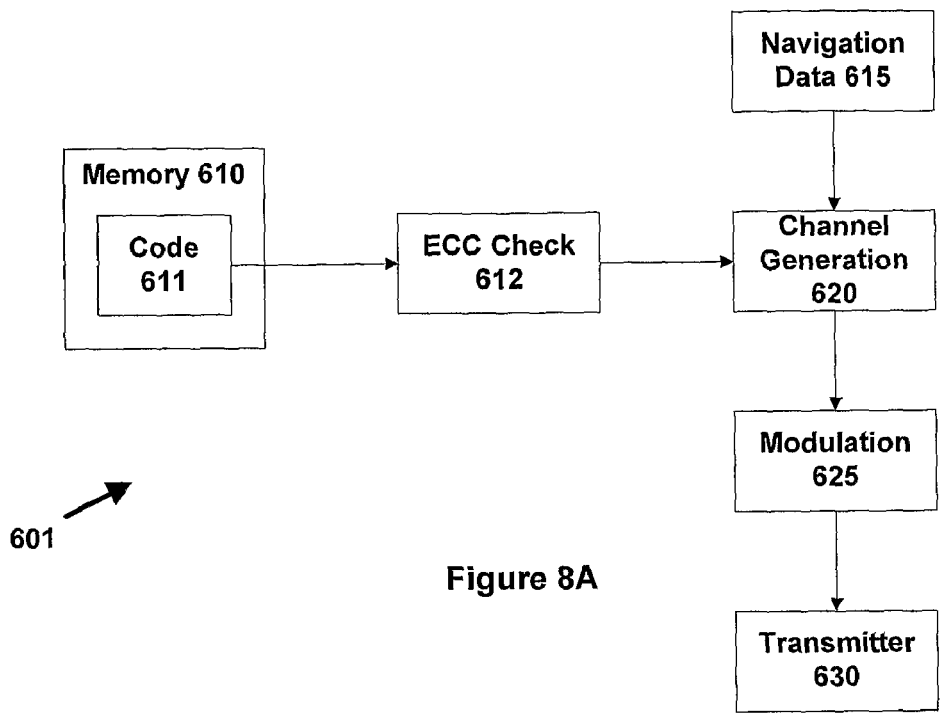
FIG. 8A is a high-level schematic diagram of a satellite system in accordance with one embodiment of the invention.

FIG. 8A is a high-level schematic block diagram of a transmission system 601 for use in a satellite payload in accordance with one embodiment of the invention. (It will be appreciated that an analogous structure could also be used in a pseudolite or other such device that emulates a satellite). The transmission system 601 utilises a tiered spreading code including a secondary code such as generated using the method of FIG. 4. At least the secondary portion of the spreading code 611 is stored in a memory device 610, which in normal broadcast activities functions as a read-only memory. In certain embodiments, the primary code may also be stored in memory 610 (or in some other memory device), either separately or in conjunction with the secondary code, depending upon how the primary code is implemented (as discussed above with reference to FIG. 7). In one implementation memory device 610 may be operated from a logical perspective as a circular buffer, using a read pointer to cycle around the stored code sequence 611.

Since the feature size of modern memory devices is very small, the stored bits in memory 610 may be vulnerable to cosmic ray hits (especially in a space environment) and other possible contamination. Accordingly, in one embodiment, the output of memory device 610 is passed through an error correction code (ECC) unit 612 to protect the accuracy of code 611. The ECC unit 612 is able to detect an error in code 611 as read out from memory 610, and may be able, in some circumstances, to automatically correct the error (depending upon the nature of the code and the error). For example, memory 610 may store two copies of the code 611, and read each bit simultaneously from both copies. If the two bits read from the different versions disagree, this signals (i.e. detects) an error in one of the stored versions. If three copies of the code 611 are stored in memory 610, then any detected error may be corrected automatically on the basis of majority voting.

The skilled person will be aware of many ECC mechanisms from data communications and data storage applications, such as the use of convolutional encoding, cyclic redundancy codes (CRC), and so on. These generally have a much higher efficiency than simply storing multiple copies of the code 611—i.e. they provide better protection against errors with a lower overhead in terms of additional storage requirements.

After the code has passed through the ECC check 612, it is combined with the navigation data 617 by the channel generation subsystem 620. The channel generation subsystem 620 may also include a subsystem such as illustrated in FIG. 7 to generate a tiered code from the secondary code from memory 610 and from the primary code (whether obtained from memory 610 or generated by some other mechanism). Alternatively, channel generation subsystem 620 may receive a tiered code 650 in which the primary and secondary codes have already been combined, for example, if stored code 611 already integrates both the primary and secondary codes.

The channel generation subsystem generally uses some form of modulo-2 addition (exclusive-OR) to combine the spreading code and the navigation data. The resulting channel is then passed to a modulation unit 625, where it is superimposed on a carrier signal using some appropriate modulation mechanism, such as binary phase shift keying (BPSK). Note that in some satellite systems, multiple channels may be modulated onto a single carrier signal. The carrier signal is then passed to transmitter 630 for broadcast to earth.

Although in some implementations code 611 may be "hard-wired" into memory 610 prior to launch, it is more flexible if memory device 610 includes a write capability—e.g. it is implemented as some form of programmable read only memory (PROM). For example, if ECC check 612 does discover that the stored code 611 has been corrupted, then a write capability for memory device 610 allows the correct version of the code to be written back into the memory device 610 (the correct version of the code may be available from the ECC unit 612 itself, or may have to be provided by a ground control system). There can also be various other reasons for wanting to update the code 611 stored in memory 610. For example, a new code might be installed to help improve performance during a testing phase, perhaps if the original code suffers from interference with some other service or satellite. There might also be commercial or security reasons for changing code 611, the former to raise licensing revenue perhaps, the latter to restrict access to the positioning signal to suitably authorised personnel.

Figure 8B:
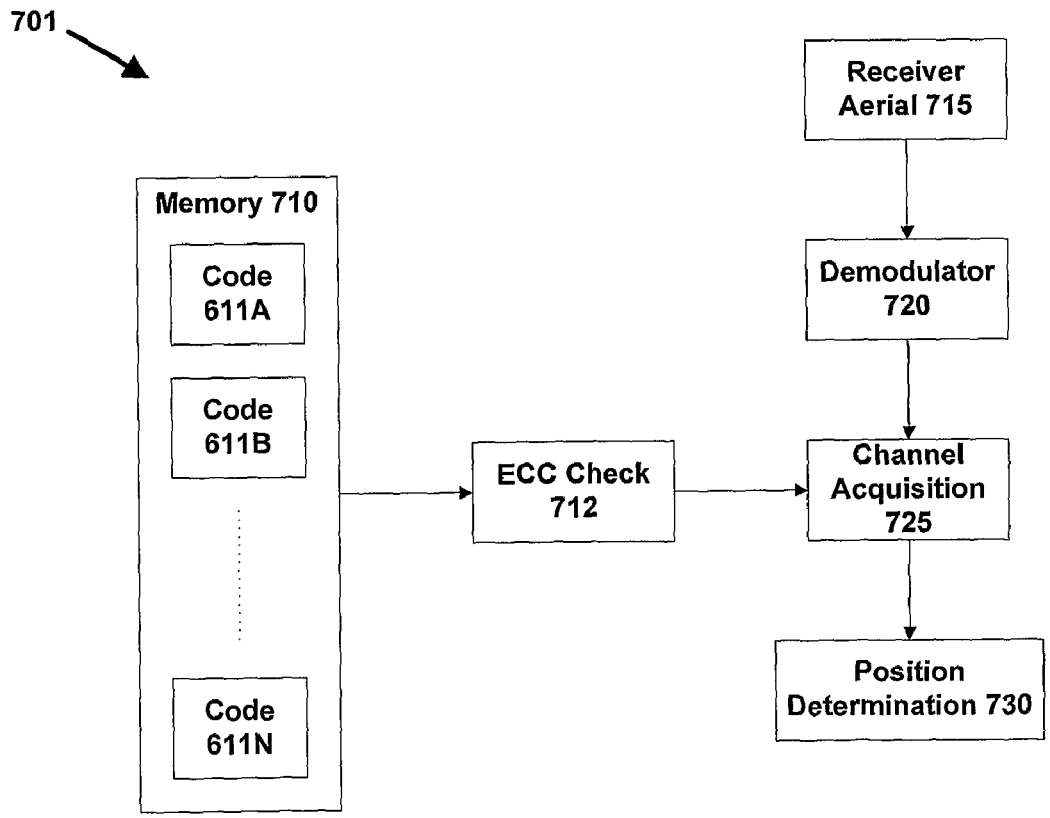
FIG. 8B is a high-level schematic diagram of a receiver system in accordance with one embodiment of the invention.

FIG. 8B is a high-level schematic block diagram of a receiver 701 in accordance with one embodiment of the invention. Receiver 701 may be provided as a stand-alone unit, or may be incorporated into some larger device, for example a mobile (cellular) telephone, a computer, an automobile or other form of vehicle, a hospital bed, an aircraft or ship, a freight container, and so on. In operation, receiver 701 includes aerial 715 for receiving a satellite signal such as that transmitted by satellite 601. The aerial 715 links to a de-modulator 720, which in turn passes the incoming de-modulated signal to channel acquisition unit 725.

The receiver 701 also includes a memory device 710 that stores at least the secondary code portions 611A, 611B . . . 611N for the constellation(s) of satellites supported by receiver 701. In addition, analogous to the situation with FIG. 8A, the primary code portions of these codes may also be stored in the relevant memory units 610A, 610B, . . . 610N, or may instead be generated using an LFSR or other suitable device, depending upon the particular choice of primary code.

Memory device 710 generally stores the entire bit patterns for the secondary codes 611A, 611B, . . . 611N, since a more compact representation of such secondary codes is not normally possible in the absence of any formalised mathematical structure. Examples of the possible bit patterns for use as secondary codes 611A, 611B, . . . 611N and for storage in memory device 710 are set out in Appendix 1. (The skilled person will appreciate that the stored bit patterns 611 need not exactly match the bit patterns broadcast from the satellite, as long as they are close enough to ensure a strong correlation for signal reception purposes).

Memory device 710 may be provided as a read only memory (ROM), or it may have some update capacity, for example, being implemented as a programmable read only memory (PROM). The latter is particularly appropriate where the codes 611A, 6111B, . . . 611N are subject to update, either for commercial or security reasons. Note that in some circumstances memory 710 may represent some form of removable storage medium that can be inserted into and removed from receiver 701. For example, memory device 710 may comprise a smart card (analogous to a SIM card in a mobile telephone) or a flash memory device. This would then allow the codes 611 in receiver 701 to be updated by replacing the removable memory device. A further possibility is that device 710 may be able to download codes from a remote system (e.g. a server) over some communication network, such as the Internet or a mobile telephone connection, for storage in and use from local RAM. This download may be subject to appropriate authorisation of the user, in order to restrict use of the satellite navigation system for commercial, security or legal reasons.

In some implementations, the output from memory 710 is passed through an ECC unit 712 to perform error detection and/or correction as described above in relation to the satellite system 601, although in other receivers the ECC check mechanism 712 may be omitted. The code 611 is then provided to the channel acquisition unit 725 so that the channel can be acquired from the de-modulated signal. The channel acquisition unit 725 is responsible for combining the primary and secondary codes for a satellite, such as by using the subsystem shown in FIG. 7, although in other embodiments this combination may be done at an earlier stage (either within device 701 or prior to loading the codes into memory 710).

Note that the satellite acquisition may be performed sequentially by trying one code 611A, then another 611B, and so on. More commonly, multiple codes (potentially all of them) are correlated against the de-modulated signal in parallel. Once the receiver has locked into a sufficient number of incoming signals by identifying the presence of their respective spreading codes 611A, 611B, the navigation data from those signals can be extracted and used by the position determination unit in conjunction with the timing of the received spreading codes to help calculate the location of the receiver.

In many embodiments, receiver 701 may be able to receive signals from more than one satellite navigation system, for example, from both Galileo and from GPS. Although the spreading codes for GPS comprise Gold codes that can be implemented as LFSRs, it will be appreciated that such codes can also be stored in their entirety within memory device 710. Accordingly, the single architecture of memory 710 is compatible with specific or bespoke code patterns as well as with conventional code patterns derived from LFSRs.

In conclusion, although a variety of embodiments have been described herein, these are provided by way of example only, and many variations and modifications on such embodiments will be apparent to the skilled person and fall within the scope of the present invention, which is defined by the appended claims and their equivalents.

APPENDIX 1

Group Secondary Code Search Results

A1.1 50 Bit Secondary Codes

This list provides the group of fifty 50-bit secondary codes that performed best according to the code evaluation tool (i.e. group G5 from Table 8).

| Group Code No | Code Sequence (Octal) | HNVp | MFp | ELW (dB) | DC Balance | Pool Code No |
|---|---|---|---|---|---|---|
| 1 | 25573627202363506 | 625.00 | 12.76 | 1.53 | 6 | 61 |
| 2 | 12074531073715754 | 625.00 | 12.76 | 1.66 | 6 | 73 |
| 3 | 26112131713246003 | 625.00 | 12.76 | 1.94 | −6 | 189 |
| 4 | 22524764556376301 | 625.00 | 12.76 | 2.13 | 6 | 251 |
| 5 | 14717210126407422 | 625.00 | 12.76 | 2.41 | −6 | 274 |
| 6 | 16011403332415354 | 625.00 | 12.76 | 2.41 | −6 | 275 |
| 7 | 02342206053427711 | 69.44 | 9.62 | 1.49 | −6 | 309 |
| 8 | 33223527774215160 | 69.44 | 7.72 | 1.49 | 6 | 333 |
| 9 | 34211130053273441 | 69.44 | 7.72 | 1.49 | −6 | 334 |
| 10 | 02473476647427350 | 69.44 | 8.56 | 1.64 | −6 | 349 |
| 11 | 36566345702370514 | 69.44 | 7.72 | 1.87 | −6 | 458 |
| 12 | 33216077625561254 | 69.44 | 6.44 | 1.87 | −6 | 466 |
| 13 | 03102573332127414 | 69.44 | 5.95 | 1.88 | 2 | 479 |
| 14 | 22570434175547724 | 69.44 | 6.44 | 1.89 | −6 | 487 |
| 15 | 00441255542176261 | 69.44 | 5.53 | 1.90 | 6 | 512 |
| 16 | 32661705165044437 | 69.44 | 6.44 | 1.93 | −2 | 565 |
| 17 | 12157442154505412 | 69.44 | 5.53 | 1.93 | 6 | 577 |
| 18 | 17524453602203046 | 69.44 | 5.53 | 1.93 | 6 | 582 |
| 19 | 21437573134427226 | 69.44 | 7.02 | 1.96 | −6 | 618 |
| 20 | 31570116647735241 | 69.44 | 5.53 | 1.95 | −6 | 663 |
| 21 | 01635506625303302 | 69.44 | 5.53 | 1.96 | 4 | 681 |
| 22 | 16155564710520176 | 69.44 | 5.17 | 1.96 | −2 | 709 |
| 23 | 34505150244730574 | 69.44 | 5.17 | 1.96 | 2 | 749 |
| 24 | 06332151612766764 | 69.44 | 5.53 | 1.98 | −6 | 815 |
| 25 | 06567264321730066 | 69.44 | 5.53 | 1.98 | −2 | 816 |
| 26 | 06401655613267310 | 69.44 | 5.53 | 1.99 | 2 | 848 |
| 27 | 33235230365000312 | 69.44 | 4.84 | 1.98 | 6 | 867 |
| 28 | 21761427357265444 | 69.44 | 5.95 | 2.00 | −6 | 886 |
| 29 | 14347403326712537 | 69.44 | 3.88 | 2.01 | −6 | 899 |
| 30 | 02516217345404065 | 69.44 | 6.44 | 2.11 | 6 | 925 |
| 31 | 17707251043155120 | 69.44 | 4.84 | 2.10 | 2 | 929 |
| 32 | 05031745761203262 | 69.44 | 4.31 | 2.18 | 2 | 963 |
| 33 | 32573570261546047 | 69.44 | 4.84 | 2.20 | −6 | 989 |
| 34 | 16551660063411015 | 69.44 | 5.53 | 2.21 | 6 | 996 |
| 35 | 21442417654542430 | 69.44 | 5.17 | 2.25 | 6 | 1027 |
| 36 | 32234400341650556 | 69.44 | 4.56 | 2.25 | 6 | 1036 |
| 37 | 12322702150221317 | 69.44 | 5.17 | 2.27 | 6 | 1056 |
| 38 | 34157326212642370 | 69.44 | 4.08 | 2.26 | −2 | 1063 |
| 39 | 14655410134643361 | 69.44 | 5.17 | 2.32 | 2 | 1095 |
| 40 | 34332656472120076 | 69.44 | 4.31 | 2.33 | −2 | 1148 |
| 41 | 12763542130347762 | 69.44 | 4.08 | 2.33 | −6 | 1154 |
| 42 | 30335502270633721 | 69.44 | 3.38 | 2.34 | −2 | 1177 |
| 43 | 37127575032146606 | 69.44 | 5.53 | 2.37 | −6 | 1209 |
| 44 | 16332067277706150 | 69.44 | 4.31 | 2.38 | −6 | 1254 |
| 45 | 20654425730130161 | 69.44 | 3.88 | 2.38 | 6 | 1269 |
| 46 | 21453155234050053 | 69.44 | 3.88 | 2.44 | 6 | 1281 |
| 47 | 24723712630336040 | 69.44 | 3.88 | 2.45 | 2 | 1282 |
| 48 | 33166074103756644 | 69.44 | 2.99 | 2.98 | −4 | 1292 |
| 49 | 02437576147522344 | 69.44 | 2.99 | 3.12 | −4 | 1295 |
| 50 | 30556472024366346 | 69.44 | 2.43 | 3.29 | −2 | 1300 |

A1.2 100 Bit Secondary Codes

This list provides the group of one hundred 100-bit secondary codes that performed best according to the code evaluation tool (i.e. group G11 from Table 9).

| Group Code No | Code Sequence (Octal) | HNVp | MFp | ELW (dB) | DC Balance | Pool Code No |
|---|---|---|---|---|---|---|
| 1 | 1017667551661733412501077343115434 | 156.25 | 7.02 | 1.77 | −8 | 2 |
| 2 | 0631254275171603073622720315202445 | 156.25 | 6.07 | 1.86 | −4 | 12 |
| 3 | 0546401132470153603121556746501601 | 156.25 | 5.79 | 1.89 | −10 | 19 |
| 4 | 1516431144017013675430711575652267 | 156.25 | 8.68 | 1.92 | 6 | 25 |

-continued

| Group Code No | Code Sequence (Octal) | HNVp | MFp | ELW (dB) | DC Balance | Pool Code No |
|---|---|---|---|---|---|---|
| 5 | 13443762553566030206175131151105223 | 156.25 | 6.58 | 1.92 | 0 | 37 |
| 6 | 13530737511472357105007411237377630 | 156.25 | 6.65 | 1.92 | 10 | 38 |
| 7 | 05156741357050022237065530564635660 | 156.25 | 7.72 | 1.95 | 4 | 47 |
| 8 | 16771255133137160514366242104537420 | 156.25 | 6.01 | 1.93 | 6 | 52 |
| 9 | 07477062564070216572452604575762330 | 156.25 | 7.44 | 1.95 | 10 | 57 |
| 10 | 14512134177243520103543006554622240 | 156.25 | 5.68 | 1.94 | −10 | 61 |
| 11 | 01770311010145124261115730213625470 | 156.25 | 9.19 | 1.98 | −10 | 66 |
| 12 | 17701246475375530423441313453511410 | 156.25 | 6.58 | 1.96 | 4 | 77 |
| 13 | 13006030556053343145352654226766760 | 156.25 | 4.88 | 1.96 | −6 | 99 |
| 14 | 17330346114477263070557502153517250 | 156.25 | 6.94 | 1.98 | 10 | 103 |
| 15 | 01566276705533744416256056747426410 | 156.25 | 5.79 | 1.97 | 10 | 107 |
| 16 | 02762201503722161461602156755277110 | 156.25 | 5.95 | 1.98 | 0 | 111 |
| 17 | 03202616103374235537625222737556700 | 156.25 | 5.58 | 1.97 | 10 | 112 |
| 18 | 06325034547107406376626775254226550 | 156.25 | 6.01 | 1.98 | 10 | 115 |
| 19 | 11472551600542622202445671674162500 | 156.25 | 6.72 | 1.99 | 8 | 120 |
| 20 | 10072706753340323236546276670633120 | 156.25 | 5.95 | 1.99 | 8 | 139 |
| 21 | 12312424440164523631700334723773060 | 156.25 | 7.02 | 2.00 | −4 | 141 |
| 22 | 14147132410033733275421717613354670 | 156.25 | 5.79 | 1.99 | 10 | 143 |
| 23 | 14172452620435746674410437102407150 | 156.25 | 5.84 | 1.99 | −4 | 144 |
| 24 | 03677711365347302716223132742427010 | 156.25 | 8.45 | 2.03 | 10 | 156 |
| 25 | 11451102360165372031570704420126500 | 156.25 | 7.91 | 2.02 | −8 | 160 |
| 26 | 13447024652442642147640302277553540 | 156.25 | 5.79 | 2.00 | −2 | 162 |
| 27 | 14343255244700222124670046547102670 | 156.25 | 7.10 | 2.01 | −10 | 165 |
| 28 | 00633343117173247725372660500545730 | 156.25 | 6.79 | 2.02 | 10 | 170 |
| 29 | 06070576422457065740212107314445170 | 156.25 | 7.18 | 2.02 | −4 | 180 |
| 30 | 06114011673617647432732272517226350 | 156.25 | 7.44 | 2.03 | 10 | 181 |
| 31 | 16350520227765173657201761623230630 | 156.25 | 5.90 | 2.01 | 10 | 192 |
| 32 | 03262253004077142727723444307102300 | 156.25 | 5.95 | 2.03 | −8 | 217 |
| 33 | 05105023312034173453623441673307750 | 156.25 | 6.13 | 2.03 | 2 | 220 |
| 34 | 07166366170255253575177201235542200 | 156.25 | 6.87 | 2.04 | 8 | 227 |
| 35 | 11227705544073656430573111434012020 | 156.25 | 6.01 | 2.03 | −6 | 230 |
| 36 | 12430674153063200423302642663257100 | 156.25 | 5.79 | 2.03 | −6 | 231 |
| 37 | 16107777026722602416105330655373100 | 156.25 | 5.53 | 2.03 | 4 | 239 |
| 38 | 17125441616337423567003265454064530 | 156.25 | 4.92 | 2.02 | 4 | 242 |
| 39 | 00303107540766105235722446415056410 | 156.25 | 6.01 | 2.04 | −10 | 244 |
| 40 | 02132670523550713715377710700136260 | 156.25 | 5.63 | 2.04 | 8 | 247 |
| 41 | 02246102403147275311617452023650350 | 156.25 | 6.19 | 2.04 | −8 | 248 |
| 42 | 11757144743041651373100640246534030 | 156.25 | 5.53 | 2.03 | 4 | 269 |
| 43 | 15305146365317071144101700551220270 | 156.25 | 5.63 | 2.04 | −8 | 276 |
| 44 | 17314551765104067251165015002036140 | 156.25 | 6.72 | 2.04 | −8 | 279 |
| 45 | 04336364602077111467525722675712503 | 156.25 | 6.79 | 2.05 | 10 | 292 |
| 46 | 16134372022506055366266535762462432 | 156.25 | 4.84 | 2.04 | −4 | 312 |
| 47 | 16251010615202763200320635553606620 | 156.25 | 5.90 | 2.05 | −10 | 313 |
| 48 | 02313437710241336447557052516033100 | 156.25 | 7.02 | 2.07 | 0 | 329 |
| 49 | 03311216517260740440355001463537520 | 156.25 | 5.79 | 2.06 | −6 | 331 |
| 50 | 11402051724230454111435017351175260 | 156.25 | 7.62 | 2.07 | −10 | 339 |
| 51 | 14777105167074302232444775274562240 | 156.25 | 5.34 | 2.05 | 8 | 340 |
| 52 | 17606137115233761430034265625552630 | 156.25 | 5.84 | 2.06 | −8 | 344 |
| 53 | 12135265645557460633440503447710710 | 156.25 | 6.72 | 2.11 | 4 | 360 |
| 54 | 07136254214017515340026270233746270 | 156.25 | 5.30 | 2.11 | 2 | 377 |
| 55 | 01174353511674244344350236411246020 | 156.25 | 5.34 | 2.12 | −8 | 383 |
| 56 | 07370020401271066213066464322732160 | 156.25 | 7.62 | 2.14 | 10 | 387 |
| 57 | 17727426226727615152610075027312340 | 156.25 | 6.19 | 2.13 | 8 | 394 |
| 58 | 00551120073747614676661214502516700 | 156.25 | 6.79 | 2.15 | −2 | 395 |
| 59 | 15641614414067507524413233366535740 | 156.25 | 6.79 | 2.15 | −6 | 404 |
| 60 | 04173652207246611017474620606210770 | 156.25 | 5.25 | 2.15 | −4 | 414 |
| 61 | 00154652631760054755575227473270300 | 156.25 | 5.21 | 2.15 | 6 | 428 |
| 62 | 11471456775261110262761436067524550 | 156.25 | 5.34 | 2.16 | −8 | 438 |
| 63 | 12150632221716773721217300771664420 | 156.25 | 6.25 | 2.17 | −6 | 439 |
| 64 | 01512234371052337152153556363337600 | 156.25 | 6.01 | 2.17 | −10 | 442 |
| 65 | 03100451535621551164321323412745400 | 156.25 | 6.51 | 2.17 | 10 | 446 |
| 66 | 03137016556503553147137670305071330 | 156.25 | 5.58 | 2.17 | 10 | 447 |
| 67 | 03416176606611666735251753302363010 | 156.25 | 6.07 | 2.18 | −8 | 461 |
| 68 | 06507457377455311505760047347431050 | 156.25 | 6.13 | 2.18 | 10 | 468 |
| 69 | 02571502304232072777020637135570730 | 156.25 | 5.04 | 2.18 | −6 | 485 |
| 70 | 03711121477515205002714502632676140 | 156.25 | 7.18 | 2.20 | −4 | 489 |
| 71 | 06261614666717663002374155251224010 | 156.25 | 5.58 | 2.18 | 2 | 493 |
| 72 | 16650241171505506063673446431026040 | 156.25 | 8.56 | 2.22 | 8 | 499 |
| 73 | 02475463510415406262570536173727210 | 156.25 | 5.53 | 2.19 | −4 | 509 |
| 74 | 04255463677751152365207207516043720 | 156.25 | 5.79 | 2.20 | 10 | 514 |
| 75 | 17556537144741431360025761560456320 | 156.25 | 5.53 | 2.19 | −8 | 534 |
| 76 | 05320610515215460211136102327437740 | 156.25 | 6.58 | 2.23 | 8 | 562 |
| 77 | 07001213231136502461133667525014700 | 156.25 | 6.44 | 2.22 | −8 | 565 |
| 78 | 01102050630264647320476605231350770 | 156.25 | 6.87 | 2.23 | −8 | 584 |
| 79 | 04161671010275136766746730252626720 | 156.25 | 6.31 | 2.24 | −8 | 593 |
| 80 | 04562731146105265607660767664414530 | 156.25 | 6.94 | 2.24 | 6 | 597 |

-continued

| Group Code No | Code Sequence (Octal) | HNVp | MFp | ELW (dB) | DC Balance | Pool Code No |
|---|---|---|---|---|---|---|
| 81 | 1374372137673215312254747423144006 | 156.25 | 5.73 | 2.22 | −8 | 611 |
| 82 | 1551022504037643667054043343540644 | 156.25 | 4.92 | 2.22 | −8 | 613 |
| 83 | 1670544005364760264631537214777321 | 156.25 | 5.43 | 2.22 | 8 | 619 |
| 84 | 0262136575407127060737522611032221 | 156.25 | 5.39 | 2.24 | −2 | 628 |
| 85 | 0344362273327420764601241467345332 | 156.25 | 6.01 | 2.24 | 2 | 632 |
| 86 | 0346373452475266641311030373173760 | 156.25 | 6.51 | 2.25 | −10 | 633 |
| 87 | 1114030775724542174216407124223414 | 156.25 | 4.92 | 2.23 | 8 | 645 |
| 88 | 1352003024305541633405722565345467 | 156.25 | 5.68 | 2.23 | −2 | 646 |
| 89 | 1511014217420521165422075130776464 | 156.25 | 4.77 | 2.23 | 8 | 649 |
| 90 | 1527665213541007307470160226446712 | 156.25 | 6.25 | 2.25 | −2 | 650 |
| 91 | 0076445040276065660210641072571147 | 156.25 | 5.58 | 2.25 | 10 | 658 |
| 92 | 0234564411765657062441274230761130 | 156.25 | 6.01 | 2.25 | 2 | 664 |
| 93 | 0315607465514722221202410627744026 | 156.25 | 5.12 | 2.24 | 10 | 666 |
| 94 | 0523574541055522406215541601610037 | 156.25 | 5.39 | 2.25 | 10 | 671 |
| 95 | 1570643707544776556110736140465053 | 156.25 | 5.79 | 2.25 | −10 | 689 |
| 96 | 0006613354515760641656021426704504 | 156.25 | 6.65 | 2.26 | 10 | 695 |
| 97 | 0141246667206500167224661761664355 | 156.25 | 6.19 | 2.27 | 0 | 698 |
| 98 | 0243440306411441633414640545775264 | 156.25 | 5.21 | 2.25 | 10 | 699 |
| 99 | 0571026031342702231523571253640063 | 156.25 | 4.66 | 2.25 | 6 | 707 |
| 100 | 0620610272661655331556160621527401 | 156.25 | 5.95 | 2.26 | 4 | 708 |
| 101 | 1206513735602311260065342343203071 | 156.25 | 5.17 | 2.25 | 8 | 718 |
| 102 | 1570733065450270342220373002426211 | 156.25 | 5.30 | 2.26 | −10 | 728 |
| 103 | 0265214066570427616613767556012326 | 156.25 | 5.04 | 2.26 | 6 | 742 |
| 104 | 0363566600733245256340445033033203 | 156.25 | 6.19 | 2.27 | −4 | 744 |
| 105 | 0674666571201520325403111470541124 | 156.25 | 6.25 | 2.27 | 10 | 751 |
| 106 | 1046701175774741642455251231432605 | 156.25 | 5.58 | 2.26 | 2 | 755 |
| 107 | 1257114556512306460054022777234303 | 156.25 | 5.39 | 2.27 | 2 | 759 |
| 108 | 1262105671017066267376636522403674 | 156.25 | 5.73 | 2.27 | 8 | 760 |
| 109 | 1656531732636700560644267344203443 | 156.25 | 5.43 | 2.27 | 4 | 774 |
| 110 | 0723664517751027171750574225014335 | 156.25 | 5.48 | 2.27 | 10 | 795 |
| 111 | 0743702765222166513602030677546766 | 156.25 | 4.73 | 2.27 | −10 | 797 |
| 112 | 1164440624007176306154576025105322 | 156.25 | 4.88 | 2.26 | 10 | 802 |
| 113 | 1266016704113115647535727614134135 | 156.25 | 6.01 | 2.28 | −6 | 809 |
| 114 | 0101217303334460522575335163144175 | 156.25 | 5.08 | 2.28 | 0 | 822 |
| 115 | 0274301166372435736571122307027322 | 156.25 | 4.81 | 2.28 | −6 | 830 |
| 116 | 0275141273623024672306211335776374 | 156.25 | 4.96 | 2.28 | −10 | 831 |
| 117 | 1203343244647367667542074320617642 | 156.25 | 5.48 | 2.29 | −6 | 854 |
| 118 | 1365371454244701230766136356766015 | 156.25 | 4.73 | 2.28 | −10 | 862 |
| 119 | 1376444436364355662102640714510772 | 156.25 | 6.72 | 2.30 | 4 | 863 |
| 120 | 1527066404205537545560776611427221 | 156.25 | 4.70 | 2.28 | 4 | 873 |
| 121 | 1601470055517463637652625165122367 | 156.25 | 5.30 | 2.28 | −10 | 876 |
| 122 | 1641233373027576347172046110572260 | 156.25 | 7.10 | 2.30 | −6 | 878 |
| 123 | 0002766647502723115324430352103441 | 156.25 | 5.79 | 2.30 | −10 | 880 |
| 124 | 0041656331720051502611055505703563 | 156.25 | 5.17 | 2.29 | 8 | 882 |
| 125 | 0240556211652765420554656032002171 | 156.25 | 5.04 | 2.29 | 10 | 886 |
| 126 | 0573266271464266242172052161604400 | 156.25 | 6.13 | 2.30 | 10 | 906 |
| 127 | 0641161577235151013464342354001264 | 156.25 | 4.50 | 2.28 | −8 | 912 |
| 128 | 1037214410012710166636145311455045 | 156.25 | 5.12 | 2.29 | −10 | 920 |
| 129 | 1043167621357072453307654755445341 | 156.25 | 4.46 | 2.29 | −10 | 921 |
| 130 | 1514653210667447525577634114164407 | 156.25 | 5.73 | 2.30 | −8 | 929 |
| 131 | 1534475063251532370627177552073440 | 156.25 | 5.39 | 2.30 | −10 | 930 |
| 132 | 1770704615227406351055415253726547 | 156.25 | 5.43 | 2.29 | 8 | 939 |
| 133 | 0161556341340536226042251442276610 | 156.25 | 6.01 | 2.31 | 10 | 945 |
| 134 | 1572121634320260166747333116740553 | 156.25 | 6.38 | 2.31 | −6 | 976 |
| 135 | 1665140542147013614441405352772443 | 156.25 | 5.39 | 2.30 | 6 | 978 |
| 136 | 1731650013522017114426450706056235 | 156.25 | 4.84 | 2.29 | 8 | 979 |
| 137 | 1325627352355616455613377214003321 | 156.25 | 6.94 | 2.65 | −10 | 981 |

The invention claimed is:

1. A method for creating a set of spreading codes for use in a satellite navigation system comprising a constellation of satellites, wherein each satellite in the constellation employs a tiered spreading code comprising at least a primary code having N1 bits and a secondary code having N2 bits, such that the tiered spreading code has an overall repetition length of N1*N2 bits, and wherein each satellite in the constellation is allocated a different secondary spreading code from said set of secondary spreading codes, the method comprising;

generating an initial set of bit patterns, wherein each bit pattern represents a potential secondary spreading code; and performing an optimization process on bit patterns within the initial set of bit patterns, whereby at least some of the bit patterns in said initial set are modified or replaced, to create a final set of bit patterns for use as the set of secondary spreading codes, wherein the optimization process utilizes a performance or cost function derived from at least one of: (a) the auto-correlation function for a bit pattern or (b) the cross correlation function between different bit patterns.

2. The method of claim 1, wherein the bit patterns in the initial set of bit patterns comprise random sequences of bits.

3. The method of claim 1, wherein the optimization process includes rejecting bit patterns that fail a balance criterion.

4. The method of claim 3, wherein said balance criterion is based on the square root of the number of bits in a bit pattern.

5. The method of claim 1, wherein the optimization process includes modifying the bit patterns by randomly flipping a bit in at least one of the bit patterns.

6. The method of claim 1, wherein the optimization process includes a first phase of identifying bit patterns having good individual properties according to said performance or cost function derived from the auto-correlation or function for a bit pattern, and a second phase of selecting the set of secondary spreading codes from the identified bit patterns having good individual properties.

7. The method of claim 6, wherein the first phase identifies at least 250 bit patterns having good individual properties.

8. The method of claim 6, wherein the second phase includes calculating the cross correlation function between every pair of identified bit patterns having good individual properties.

9. The method of claim 1, wherein the number of bits in a bit pattern is in the range 25 to 512.

10. The method of claim 9, wherein the number of bits in a bit pattern is in the range 50 to 128.

11. An apparatus incorporating a final set of bit patterns created using a method for creating a set of spreading codes for use in a satellite navigation system comprising a constellation of satellites, wherein each satellite in the constellation employs a tiered spreading code comprising at least a primary code having N1 bits and a secondary code having N2 bits, such that the tiered spreading code has an overall repetition length of N1*N2 bits, and wherein each satellite in the constellation is allocated a different secondary spreading code from said set of secondary spreading codes, the method comprising;
generating an initial set of bit patterns, wherein each bit pattern represents a potential secondary spreading code; and
performing an optimization process on bit patterns within the initial set of bit patterns, whereby at least some of the bit patterns in said initial set are modified or replaced, to create a final set of bit patterns for use as the set of secondary spreading codes, wherein the optimization process utilizes a performance or cost function derived from at least one of: (a) the auto-correlation function for a bit pattern or (b) the cross correlation function between different bit patterns.

12. The apparatus of claim 11, wherein said bit patterns are protected by an error-correcting code.

13. The apparatus of claim 11, further comprising at least one read only memory (ROM) which stores the primary code and second code portions of the tiered spreading codes.

14. The apparatus of claim 11, wherein said apparatus comprises a receiver.

15. The apparatus of claim 11, wherein said apparatus comprises a removable memory device for use in a receiver.

16. The apparatus of claim 15, wherein said bit patterns are protected by an error-correcting code.

17. The apparatus of claim 15, wherein said memory device incorporates a final set of bit patterns selected substantially from the bit patterns set out in a column entitled "Code Sequence (Octal)" in Appendix A1.1 or Appendix A1.2.

18. The apparatus of claim 11, wherein the apparatus incorporates one or more bit patterns from the final set of bit patterns.

19. The apparatus of claim 18, wherein said apparatus incorporates at least one bit pattern selected from the bit patterns set out in a column entitled "Code Sequence (Octal)" in Appendix A1.1 or Appendix A1.2.

20. The apparatus of claim 18, wherein said apparatus comprises a satellite.

21. The apparatus of claim 18, wherein said apparatus comprises a pseudolite.

22. A method of operating a receiver for use in conjunction with a satellite navigation system that employs tiered spreading codes, each tiered spreading code comprising at least a primary code having N1 bits and a secondary code having N2 bits, such that the tiered spreading code has an overall repetition length of N1*N2 bits, the method comprising:
accessing a set of stored bit patterns, said bit patterns corresponding to the secondary codes used by the satellite navigation system, wherein said secondary codes are created by:
generating an initial set of bit patterns, wherein each bit pattern represents a potential secondary spreading code, and
performing an optimization process on bit patterns within the initial set of bit patterns, whereby at least some of the bit patterns in said initial set are modified or replaced, to create a final set of bit patterns for use as the set of secondary spreading codes, wherein the optimization process utilizes a performance or cost function derived from at least one of: (a) the auto-correlation function for a bit pattern, or (b) the cross correlation function between different bit patterns; and
using the set of stored bit patterns to acquire signals from the satellite navigation system.

23. The method of operating a receiver for use in conjunction with a satellite navigation system of claim 22, wherein said bit patterns corresponding to secondary codes used by the satellite navigation system are selected substantially from the bit patterns set out in a column entitled "Code Sequence (Octal)" in Appendix A1.1 or Appendix A1.2.

24. The method of claim 22, wherein said stored bit patterns are accessed by the receiver over a network.

25. A method of operating a server that communicates with receivers for use in conjunction with a satellite navigation system that employs tiered spreading codes, each tiered spreading code comprising at least a primary code having N1 bits and a secondary code having N2 bits, such that the tiered spreading code has an overall repetition length of N1*N2 bits, the method comprising:
storing a set of bit patterns, said bit patterns corresponding to the secondary codes used by the satellite navigation system, wherein said secondary codes are created by:
generating an initial set of bit patterns, wherein each bit pattern represents a potential secondary spreading code, and
performing an optimization process on bit patterns within the initial set of bit patterns, whereby at least some of the bit patterns in said initial set are modified or replaced, to create a final set of bit patterns for use as the set of secondary spreading codes, wherein the optimization process utilizes a performance or cost function derived from at least one of: (a) the auto-correlation function for a bit pattern, or (b) the cross correlation function between different bit patterns;
receiving a request from a receiver to access the set of stored bit patterns; and
supplying the stored bit patterns to the receiver in response to said request for use in acquiring signals from the satellite navigation system.

26. The method of operating a server of claim 25, wherein said bit patterns corresponding to secondary codes used by the satellite navigation system are selected substantially from the bit patterns set out in a column entitled "Code Sequence (Octal)" in Appendix A1.1 or Appendix A1.2.

* * * * *